United States Patent
Hanna

(10) Patent No.: US 10,360,000 B2
(45) Date of Patent: Jul. 23, 2019

(54) GENERIC TEMPLATE NODE FOR DEVELOPING AND DEPLOYING MODEL SOFTWARE PACKAGES MADE UP OF INTERCONNECTED WORKING NODES

(71) Applicant: Blackwatch International, Rockville, MD (US)

(72) Inventor: Michael Hanna, Fairfax, VA (US)

(73) Assignee: Blackwatch International, McLean, VI (US)

( * ) Notice: Subject to any disclaimer, the term of this patent is extended or adjusted under 35 U.S.C. 154(b) by 221 days.

(21) Appl. No.: 14/728,742

(22) Filed: Jun. 2, 2015

(65) Prior Publication Data

US 2015/0347096 A1 Dec. 3, 2015

Related U.S. Application Data

(60) Provisional application No. 62/006,592, filed on Jun. 2, 2014.

(51) Int. Cl.
  *G06F 8/20* (2018.01)
  *G06F 8/36* (2018.01)
  *G06F 8/61* (2018.01)
  *G06F 8/34* (2018.01)
  (Continued)

(52) U.S. Cl.
  CPC .................. *G06F 8/36* (2013.01); *G06F 8/20* (2013.01); *G06F 8/34* (2013.01); *G06F 8/61* (2013.01); *G06F 9/547* (2013.01); *H04L 67/12* (2013.01); *Y04S 40/18* (2018.05)

(58) Field of Classification Search
  CPC ..... G06F 8/20; G06F 8/34; G06F 8/36; G06F 8/61
  See application file for complete search history.

(56) References Cited

U.S. PATENT DOCUMENTS

| | | |
|---|---|---|
| 5,970,252 A | 10/1999 | Buxton et al. |
| 8,266,585 B2 | 9/2012 | Funto et al. |
| 2007/0226244 A1* | 9/2007 | Chandrasekharan ..... G06F 8/20 |

(Continued)

OTHER PUBLICATIONS

International Search Report issued in corresponding application PCT/US2015/033807, completed and dated Sep. 16, 2015.

(Continued)

*Primary Examiner* — Wei Y Zhen
*Assistant Examiner* — Amir Soltanzadeh
(74) *Attorney, Agent, or Firm* — Griffin and Szipl PC

(57) ABSTRACT

A generic template node for developing and deploying model software packages made up of interconnected working nodes derived from modifying copies of a generic template node. In one embodiment, a generic template node comprises: a plurality of definable input and output channels; at least one modifiable process routine capable of executing instructions for integrating into the generic template node at least one of, (i) a custom process, (ii) a canned common function, e.g., Sum and/or Average, and (iii) a third-party software package; a setup routine; and a plurality of definable output channels. The setup routine is operably linked to a host process to perform setup initialization of the generic template node. The generic template node is executable using at least one processor in communication with at least one memory having instructions to modify the generic template node in response to user requests.

21 Claims, 30 Drawing Sheets

(51) Int. Cl.
     *G06F 9/54*      (2006.01)
     *H04L 29/08*     (2006.01)

(56) References Cited

U.S. PATENT DOCUMENTS

| | | | |
|---|---|---|---|
| 2008/0091720 A1* | 4/2008 | Klumpp | G06F 8/10 |
| 2009/0125977 A1* | 5/2009 | Chander | G06F 8/36 |
| | | | 726/1 |
| 2010/0070945 A1 | 3/2010 | Tattrie et al. | |
| 2013/0023247 A1* | 1/2013 | Bolon | H04W 24/08 |
| | | | 455/414.1 |
| 2014/0201836 A1* | 7/2014 | Amsler | H04L 63/20 |
| | | | 726/23 |
| 2015/0046791 A1* | 2/2015 | Isaacson | G06F 17/248 |
| | | | 715/234 |
| 2016/0012235 A1* | 1/2016 | Lee | G06Q 10/0635 |
| | | | 726/25 |

OTHER PUBLICATIONS

Written opinion of the International Searching Authority issued in corresponding application PCT/US2015/033807, aompleted and dated Sep. 16, 2015.

\* cited by examiner

Figure 1 – Example Model Construction

Figure 2 – Generic Processing Node

Figure 3 – Connector Example

Figure 4 – Database Node Example

Figure 5 – REST Node Example

Figure 6 – Third Part Wrapper Node Example

Figure 7 – Model Host Process Initialization

Figure 8 – Node Initializaiton

Figure 9 – Channel Initialization

Figure 10 – Model Host Process Execution

Figure 11 – Node Process Execution

Figure 12 – Channel Process Execution

Figure 13 – Sum Node Example

Figure 14 – Database Output Node Example

Figure 15 – IED Implementation, Data Generator Node

Figure 16 — IED Implementation, History Node

Figure 17 – IED Implementation, Location Node

Figure 18 – IED Implementation, Clustering Node

Figure 19 – IED Implementation, Probability from Accuracy Node

Figure 20 – IED Implementation, Probability Combiner Node

Figure 21 – IED implementation, Neural Network Node

Figure 22 – IED Implementation, Polygon Generator Node

Figure 23 – IED Implementation, GMap Display Node

Figure 24 – Cyber Security Example Model

Figure 25 – File Access Node

Figure 26 – Normalizer Node

Figure 27 – Event Clustering Node

FIG. 28 – Cyber RNN Node

GENERIC TEMPLATE NODE FOR DEVELOPING AND DEPLOYING MODEL SOFTWARE PACKAGES MADE UP OF INTERCONNECTED WORKING NODES

This application claims benefit from U.S. Provisional Patent Application 62/006,592, filed Jun. 2, 2014, the entire disclosure of which is hereby incorporated by reference.

One or more sections of this disclosure may or may not have been developed during the course of United States Government Contract FA8650-12-C-1357 USAF/AFMC.

TECHNICAL FIELD

The invention relates generally to a system and method for enabling users with no more than novice level computer coding skills to engage in modular development and deployment of software packages. More particularly, the invention relates to a generic template node for developing and deploying model software packages comprised of interconnected working nodes (or integrated nodes).

BACKGROUND ART

As noted in U.S. Pat. No. 8,266,585, software tools providing an Integrated software Development Environment (IDE) are known; these tools provide a programming environment integrated into an application that makes available to the software developer, in addition to a textual source code editor, a graphic code builder, with which the programmer can interact through a Graphical User Interface (GUI), a source code compiler, a linker, possibly an interpreter, and a debugger; examples of IDE tools are Visual Studio (A product of Microsoft, 15010 Northeast 36th Street, Redmond, Wash.), Delphi (A Product of Embarcadero 275 Battery Street, Suite 1000, San Francisco, Calif.), Jbuilder (A Product of Embarcadero, 275 Battery Street, Suite 1000, San Francisco, Calif.), FrontPage (A product of Microsoft 15010 Northeast 36th Street, Redmond, Wash.), DreamWeaver (A product of Adobe Systems Incorporated, 345 Park Avenue, San Jose, Calif.), just to cite a few; another commercially known software design tool is Rational Rose by IBM Corporation, which is an object-oriented Unified Modelling Language (UML) software design tool intended for visual modelling and component construction of software applications. Another graphical software design tool is LabView (A product of National Instruments Corporation, 11500 N MoPac Expwy Austin, Tex.). However, their remains a need for a software development system and methodology that allows a novice level user lacking computer coding skills to develop complex algorithms particularly in the area of predictive algorithms. Applicant mentions the above merely by way of background and does not admit that any of the above are prior art to the present invention.

SUMMARY OF THE INVENTION

In view of the above objectives, the present inventor has provided a generic template node for developing and deploying model software packages made up of interconnected working nodes (or integrated nodes) derived by modifying copies of a generic template node. In one embodiment, a generic template node comprises: a plurality of definable input and output channels; at least one modifiable process routine capable of executing instructions for integrating into the generic node at least one of, (i) a custom process, (ii) a canned common function, e.g., Sum and/or Average, and (iii) a third-party software package; a setup routine; and a plurality of definable output channels. The setup routine is operably linked to a host process to perform setup initialization of the generic template node. The generic template node is executable using at least one processor in communication with at least one memory having instructions to modify the generic template node to allow a user to modify the process routine and the input and output channels to convert the generic template node into a working node (or integrated node).

Further in accordance with the above objectives, there has been provided another embodiment of a generic template node. The generic template node comprises a plurality of definable input and output channels; at least one user-modifiable process routine capable of executing instructions for integrating into the generic template node at least one of, (i) a custom process, (ii) a canned common function, and (iii) a third-party software package; a host process; and a setup routine, operably linked to the host process to perform setup initialization of the generic template node, and wherein the generic template node is stored on at least one memory in communication with at least one processor.

In accordance with yet another embodiment, there is provided the generic template node described above, wherein the process routine is modifiable to allow a user to modify the process routine and the input and output channels to convert the generic template node into a working node (or integrated node).

In accordance with a further embodiment, the process routine comprises an overridable setup routine.

In accordance with a still further embodiment, there is provided a method of modular software development by individually modifying a plurality of generic template node templates to create a model made up of interconnected working nodes (or integrated nodes), wherein a compiler is not required in developing the working nodes (or integrated nodes).

In accordance with yet another embodiment, there is provided a method of modular software development by individually modifying a plurality of generic template node templates to create a model made up of interconnected working nodes (or integrated nodes). The method of this embodiment comprises: (a) providing a generic template node as recited above; (b) modifying the process routine to create a working node (or integrated node) by executing instructions for integrating into the generic template node at least one of, (i) a custom process, and (ii) integrating a third-party software package; (c) repeating steps (a) and (b) to create a plurality of working nodes (or integrated nodes); and (d) providing connectivity between the working nodes (or integrated nodes), wherein the host process controls the working nodes (or integrated nodes) to create a model software package.

In accordance with a still further embodiment, there is provided a method of predicting the presence of improvised explosive devices (IEDs) in an external environment. The method of this embodiment comprises modifying a plurality of generic template nodes recited above to develop a model for, determining the location of the external environment; classifying the location based on predetermined location types to provide a location_type; receiving historical data on previous actual detection of IEDs in the location and performing an age analysis of the historical data; performing a weight risk analysis based on age of the historical data and location_type; detecting presence of IEDs in response to raw detection data received via one or more sensors; calculating Positive Predictive Value (PPV) and Negative Predictive Value (NPV) for each detected IED; calculating a confidence value for each detected IED based on PPV verses NPV; weighting the confidence value of each detected IED based on location_type and age analysis of the location to provide a weighted confidence value; performing a cut-off value for each weighted confidence value to predict one or more IEDs in said location; and outputting the predicted locations of IEDs.

According to another embodiment, the method of predicting the presence of improvised explosive devices (IEDs) further comprises the step of classifying the likely type of each predicted IED based on the historical data on previous actual detection of IEDs in the location.

According to yet another embodiment, the method predicting the presence of improvised explosive devices (IEDs), is modified wherein the step of outputting the reportable detections of IEDs includes outputting instructions for a bomb disposal crew to deploy to examine at least one predicted IEDs.

According to a still further embodiment, the method predicting the presence of improvised explosive devices (IEDs), is modified wherein a development platform is used to generate computer code to perform said method, wherein the platform comprises at least one generic template node.

According to yet another embodiment, there is provided a system for predicting the presence of improvised explosive devices (IEDs) in an external environment. The system of this embodiment comprises: modifying a plurality of generic template nodes as recited above to develop a model for, determining the location of the external environment; classifying the location based on predetermined location types to provide location_type; receiving historical data on previous actual detection of IEDs in the location and performing an age analysis of the historical data; performing a weight risk analysis based on age of the historical data and location_type; detecting presence of IEDs in response to raw detection data received via one or more sensors; calculating Positive Predictive Value (PPV) and Negative Predictive Value (NPV) for each detected IED; calculating a confidence value for each detected IED based on PPV verses NPV; weighting the confidence value of each detected IED based on location_type and age analysis of the location to provide a weighted confidence value; performing a cut-off value for each weighted confidence value to provide reportable detections of IEDs, and outputting the reportable detections of IEDs.

In accordance with another embodiment, there is provided a system for executing a plurality of generic template nodes, comprising: one or more memories having a generic node template as described above stored thereon; and one or more processors operably connected to the one or more memories. In a further embodiment of the system, the one or more processors are connected in parallel.

A system as above is further provided for predicting the presence of improvised explosive devices (IEDs) in an external environment. This further system is made by the method of modifying a plurality of generic template nodes as described above to develop a model to detect IEDs; using the model to obtain history data for a selected external environment and raw IED detection data obtained from the selected external environment; combining the history data and raw detection data; generating cluster data and clustered detection data; performing PPV and NPV analysis of the clustered detection data to obtain confidence detection data; calculating combined confidence data based on a combination of clustered detection data, confidence detection data, and cluster data to provide detection count data and detection combined confidence data, with cluster data remaining unchanged; feeding detection count data and detection combined confidence data to a recurrent neural network to provide detection result data for each cluster; generating polygon data from the detection result data for each cluster; and outputting the polygon data to a display system.

According to a still further embodiment, there is provided a system as described above for predicting the presence of improvised explosive devices (IEDs) in an external environment. The system comprises one or more memory elements containing thereon instructions for modifying a plurality of generic template nodes described above to develop a model for, determining the location of the external environment, classifying the location based on predetermined location types to provide location_type, and receiving historical data on previous actual detection of IEDs in the location and performing an age analysis of the historical data; a preprocessing layer for, performing a weight risk analysis based on age of the historical data and location_type, and detecting presence of IEDs in response to raw detection data received via one or more sensors; a cognition layer having a processor associated therewith and having memory with instructions therein for, calculating Positive Predictive Value (PPV) and Negative Predictive Value (NPV) for each detected IED, calculating a confidence value for each detected IED based on PPV verses NPV; weighting the confidence value of each detected IED based on location_type and age analysis of the location to provide a weighted confidence value, and applying a cut-off value for each weighted confidence value to provide reportable detections of IEDs; and an output layer having a processor associated therewith and having memory with instructions therein for outputting the reportable detections of IEDs In accordance with a still further embodiment, there is provided a method of providing the building blocks of a cyber security. This method comprises: modifying a plurality of generic template nodes of claim 1 to provide, a file access node, a normalization node, an event clustering node, and an cyber RNN node.

In a still further embodiment the file access node includes an Execution Trigger inherited from a generic node template.

In a yet further embodiment, the normalization node includes an Execution Trigger inherited from a generic node template.

In another embodiment, the event clustering node includes an Execution Trigger inherited from a generic node template.

In yet another embodiment, the cyber RNN node includes an Execution Trigger inherited from a generic node template.

In another embodiment, there is provided a method of providing the building blocks of a predicting the presence of improvised explosive devices (IEDs). This method comprises: modifying a plurality of generic template nodes described above to provide, a History Node node, a Location Node, a Clustering Node, a Probability Node, a Probability Combiner Node, and a Neural Network Node.

In accordance with one more embodiment, the Probability Node is a Probability from Accuracy Node.

In accordance with yet another embodiment, there is provided a method of providing the building blocks of a predicting the presence of improvised explosive devices (IEDs). This method comprises: modifying a plurality of generic template nodes described above to provide, a History Node node, a Location Node, a Clustering Node, a Probability from Accuracy Node, a Probability Combiner Node, a Neural Network Node, a Polygon Generator Node, and a GMap Display Node.

Yet further preferred embodiments of the present invention will be described below in the Detailed Description of Preferred Embodiments together with the attached Figs. in which like elements are described using like reference numerals.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a generic template node for developing and deploying model software packages comprised of interconnected working nodes (or integrated nodes) 40. A working node (or integrated node) 40 developed by modifying a generic template node inherits its base capabilities. Thus, each working node (or integrated node) 40 is derived from a parent generic template. More accurately, each working node (or integrated node) 40 is obtained by modifying a copy of the generic template node. This way a plurality of working nodes (or integrated nodes) can be provided without inadvertently overwriting a master copy of the generic template node. It will be understood that the generic template node of the present invention is not set in stone and over time will see new features and functionalities added, but the core concept will remain the same.

An unexpected benefit of the present invention is that a generic template node does not have to be compiled after modification by the user. This means working nodes (or integrated nodes) can be produced (derived from the generic template node) without using a compiler. This is a huge advantage because languages such as, but not limited to, C and C++ require a computer program (or set of programs) that transforms source code written in a programming language into executable program. A person of ordinary skill in the art of computer programming would understand that this represents a significant time saver particularly with regard to the development of complex algorithm. A compiler is not needed to create or deploy a model 5.

Figure 30:
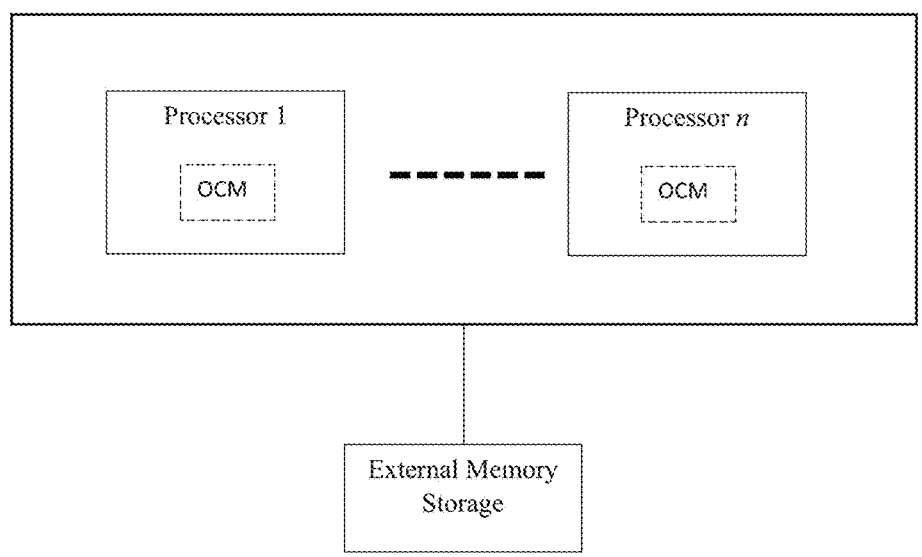
FIG. 30 shows a schematic of hardware according to the present invention.

In one embodiment, a generic template node 65 comprising: a plurality of definable input 150 and output 190 channels; at least one modifiable process routine 160 capable of executing instructions for integrating into the generic node at least one of, (i) a custom process, e.g., custom user generated code, (ii) a wrapped third party software product, and (iii) a canned common functions, e.g., Sum and/or Average; a setup routine; and a plurality of definable output channels. The setup routine is operably linked to a host process to perform setup initialization of the generic template node 65. The generic template node is executable using at least one processor in communication with at least one memory having instructions to modify the generic template node 65 to create a working node (or integrated node) 65. The memory can be on-chip-memory (OCM) and/or external memory such as, but not limited to, external memory storage as shown in FIG. 30.

A generic template node can also be modified by wrapping or integrating therein custom code defining a custom process feeding data to or from a wrapped third-party software component. Specifically, it will be understood that the generic template can be modified in various user selected ways to produce a working node (or integrated node). For example, a generic template node can be modified by integrating therein a combination of a custom process in series with a print driver to produce a working node (or integrated node) that can perform a custom process and output the data produced by the custom process using the print driver.

Figure 1:
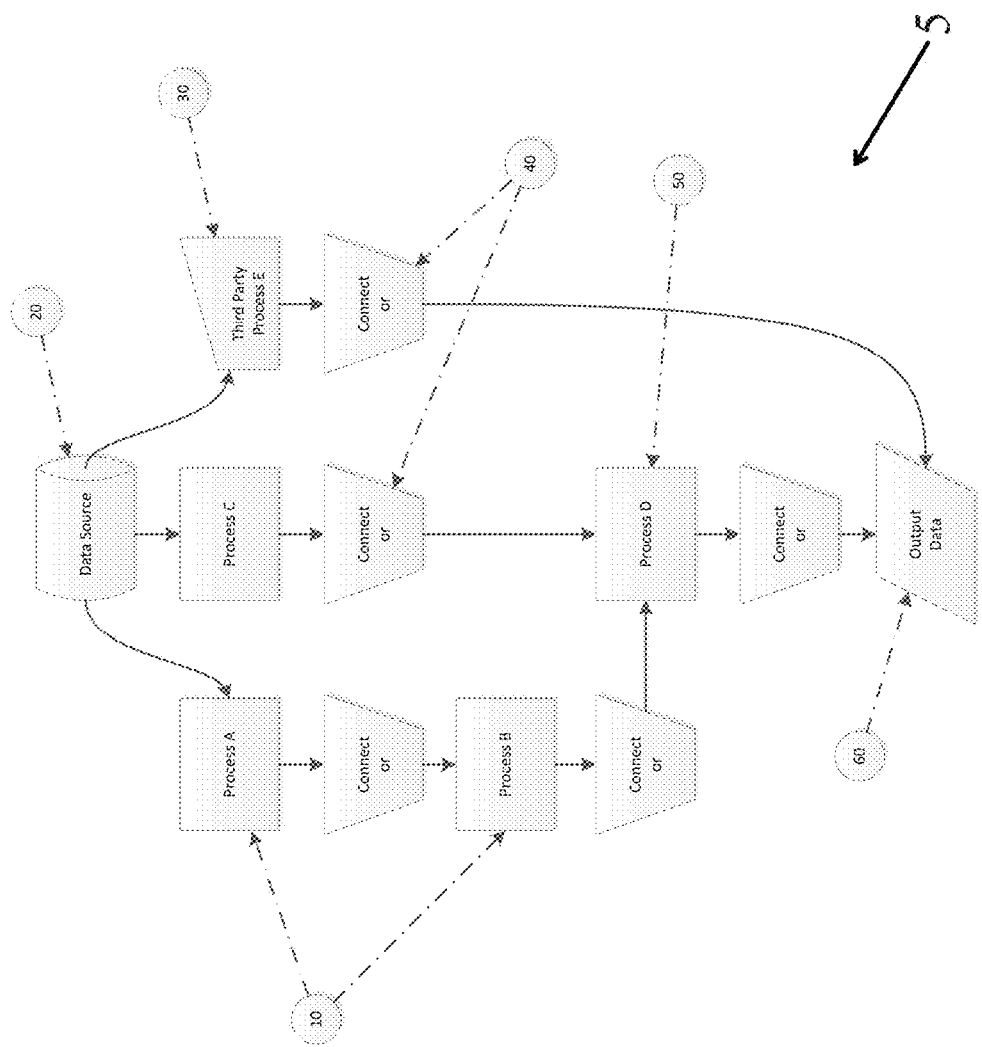
FIG. 1 shows a schematic of a model software product according to the present invention.
Figure 2:
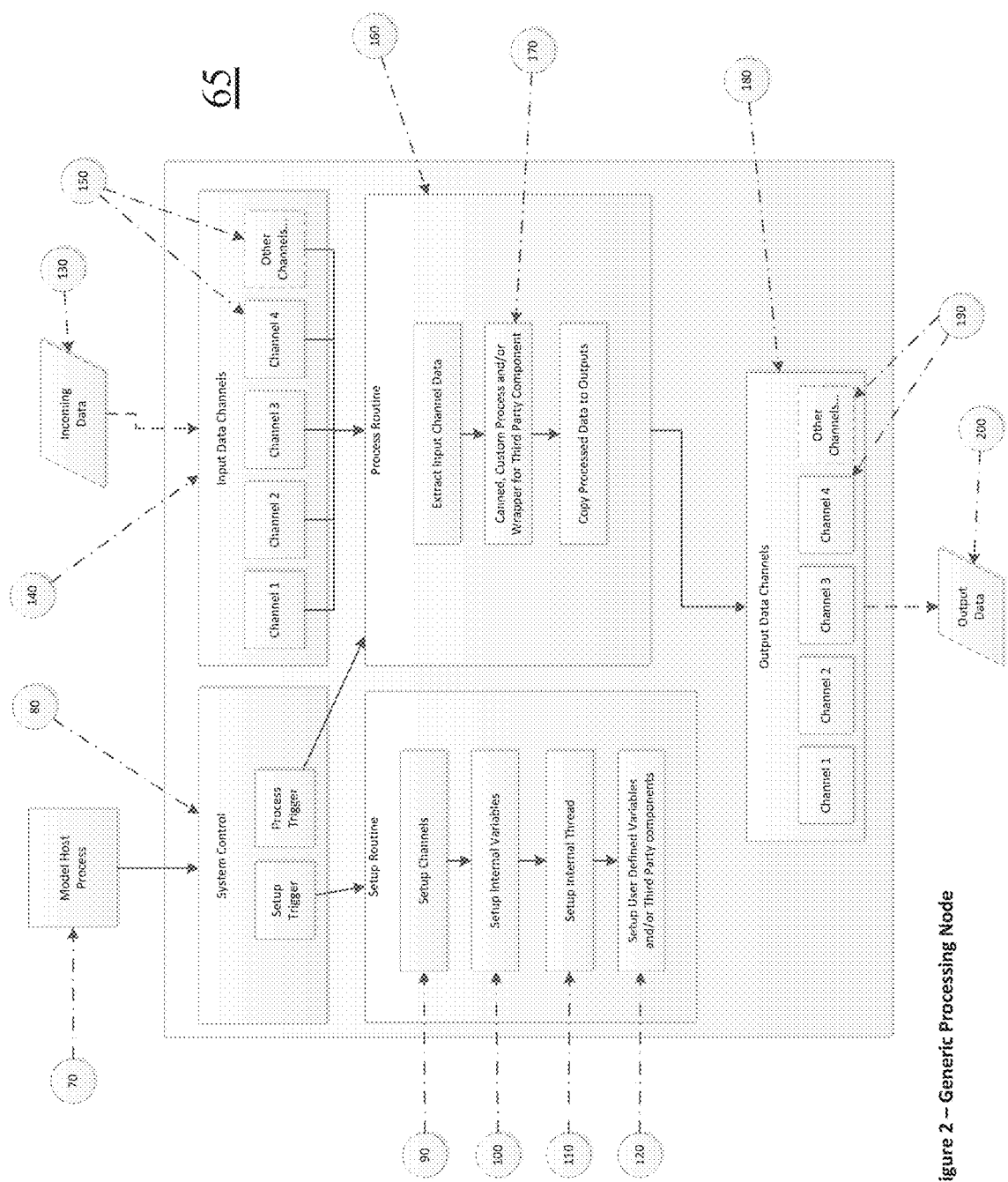
FIG. 2 is a schematic showing the control and functionality of an example generic template node according to the present invention.

FIG. 1 shows a generalized schematic of a model 5, which comprises working nodes (or integrated nodes) 10 and connectors 40 according to an embodiment of the present invention. Internal functionality of an exemplar generic template node 65, is shown in FIG. 2. Each working node (or integrated node) 10 is derived from a generic template node. An example of a generic template node 65 is shown in FIG. 2. A model may also comprise of nodes not derived from a generic template node; for example, an output node operatively linked to an output device such as a printer may take the form of a prior art print driver. In contrast, a working node (or integrated node) 10 is obtained by modifying a generic template node.

The generic template node 65 is modified to produce a working node (or integrated node) 10. The generic template node 65 can be reused to create any number of working nodes (or integrated nodes) 10 to produce a desired model 5. Thus, the generic template node 65 is a generic template from which other nodes (working nodes (or integrated nodes) 10) are developed.

It should be understood that the term "working node (or integrated node)" as used herein is used to distinguish between functions or software components developed using the generic template node 65 from functions or software components of the prior art. Also, the term "model" is purposefully used to distinguish software applications developed using the generic template node 65 from software packages of the prior art.

For the purpose of this disclosure, a novice user can be defined as someone with limited or no experience of writing code using a language such as, but not limited to: C, C++, Pascal, FORTRAN, Basic, COBOL, and JAVA. While it is envisaged that the present invention is of particular use to a novice user, the present invention can of course also be used by a professional software developer.

Working nodes (or integrated nodes) 10 serve as the fundamental building blocks of models 5 produced by the generic template node of the present invention. Models 5, a generalized schematic of which is shown in FIG. 1, comprise of working nodes (or integrated nodes) 10 some of which operate in parallel and some in series. Working nodes (or integrated nodes) 10 whether they be in series or in parallel, are executed on one or more processors capable of working in parallel and/or in series.

Third-party software can be inserted into a model 5 at 30 using a generic template node 65 itself modified by integrating a third-party software therein to create a working node (or integrated node) with the third-party software wrapped therein. Third-party processes can be software packages such as, for example, a third-party statistics program. Specifically, the generic template node 65 enables a novice programmer to insert third-party processes into a model 5. It will be understood that the generic template node 65 can also be used by professional programmers.

Processors used to execute working nodes (or integrated nodes) optionally have threading capability. Each processor operates in conjunction with memory having instructions thereon for executing one or more working nodes (or integrated nodes) 10. Working nodes (or integrated nodes) 10 running on different processors communicate via connectors 40. A third-party process is integrated into a model by directing required data input from an upstream location through one or more connectors 40 to the third-party process wrapped in the working node (or integrated node) 10, and data output from the working node (or integrated node) is directed through one or more connectors 40 to a location downstream in the model as shown in the example model 5 of FIG. 1. Connectors 40 are not limited to directing data to downstream locations, but may also direct data, for example, to an upstream working node (or integrated node).

An example of the internal functionality of a generic template node 65 is shown FIG. 2. A generic template node 65 has multiple defined inputs and outputs supporting any data type as needed. The term "model" is used herein in reference to a plurality of working nodes (or integrated nodes) and their assigned I/O connections, i.e., definable input and output channels, respectively. A model 5 is made up of interconnected working nodes (or integrated nodes) at least one of which is developed by modifying a generic template node 65. Once developed, a model 5 can run on conventional hardware made up of at least one processor in communication with memory that stores instructions to execute the running of working nodes (or integrated nodes) 10 that make up model 5.

Connectors 40 provide a simple visual method to select data flow through the model 5. A connector 40 maps specific outputs on one working node (or integrated node) to specific inputs on another node. Connectors 40 may be used between any nodes. Connectors 40 allow users to select specifically where each input and output is connected, thus defining the data flow through the nodes and hence through the model. This is especially useful where only a few channels need to be mapped to various nodes.

The present invention allows programmers to develop nodes once so that they may be reused in various models by model designers. This may include custom codes, data access or even access to a third-party DLL (Dynamic-link library) provided by a software package like Matlab or Neurosolutions. The nodes accomplish this by:

1. Inputs and outputs are implemented with "generics". A "generic" is a programming term which means an element that may be assigned a particular type as needed, and that this type may not be known when the application is compiled. Implemented as such, a node designer need only say "I want an input channel that is an integer", data set, bitmap or other complex object as needed. The node itself has all of the processes in place to automatically create the input or output channel and any supporting mechanisms require to make it function.
2. Threading, timing and triggering are all including within the generic template node. A node designer does not have to write code to manage initializing threads, triggering threads to process or for threads to access input and output data. All functionality is prebuilt within the nodes.
3. Communication with other nodes (through connectors) is prebuilt within the nodes. Each node accesses input from other nodes and output to other nodes and places data in buffers as required.
4. All nodes automatically understand their I/O hierarchy. Each node automatically understands where it is within a larger model and self-schedules itself in cooperation with other nodes to processing order and threading parallelization.

The processors on which the working nods run may have memory integrated therein for storing process instructions and/or be in communication with memory for storing process instructions, i.e., operatively linked to memory whether it be on-chip memory or a memory separate from the processor but connected or otherwise in communication with the processor.

For example, working nodes (or integrated nodes) A, B and third-party process E in FIG. 1 may be run on the same processor though it is preferred that separate working nodes (or integrated nodes) are run on processors operating in parallel thereby allowing computations and other tasks to be performed as efficiently as possible especially in situations where real time processing of complex data is critical such as, for example, on the battle field or during a cyber-attack. The generic template node 65 is designed to enable users with limited programming experience, such as a bomb disposal soldier in an armored vehicle, to create working nodes (or integrated nodes) by modifying generic template nodes, or otherwise subtract or add working nodes (or integrated nodes) with different data processing capabilities to a model. For example, by adding an additional working node (or integrated node), e.g., from a library of working nodes (or integrated nodes), which may be downloaded wirelessly from a library of accredited working nodes (or integrated nodes), or by modifying a generic template node 65 to add the capability of processing data from ground penetrating radar devices to further enhance the army disposal crews ability to detect, for example, IEDs (improvised explosive devices) on roadways. It should be understood that the generic template node 65 can be deployed in the field to modify models already running, e.g., on an IED detection system installed on a military vehicle and/or quickly develop new models de novo to suit different or modified mission requirements in a changing battle scenario.

It is preferred that working nodes (or integrated nodes) derived by modifying the generic template node 65 (most often by modifying copies of the generic template code 65) are run on scalable systems configured to run in parallel and comprised of microprocessors able to run threads thereon. For example, one or more 64 bit processors with thread implementation such as the SPARC® (Scalable Processor Architecture, e.g., the OpenSPARC T2® originally supplied by Sun Microsystems Inc®, now acquired by Oracle America Inc®).

An important advantage of running a software package, i.e., model, developed using a generic template node is that a novice user is able to tweak, append, replace, or subtract individual features or processes (e.g., one or more nodes) from a model to improve its performance in response to demands in the field such as predicting the location of IEDs (improvised explosive devices) during a patrol in the field. It should be appreciated that having the capability to add, replace/substitute a node within a collection of nodes that make up a model provides a huge advantage. Also, an unexpected result of the present invention is that one or more third-party software products can be inserted and integrated, for example, at 3 in FIG. 1.

Third-party technologies may be wrapped within a node for simple implementation and integration, for example, at 3 in FIG. 1. This may include code or compiled libraries and executables (Matlab, Neurosolutions, etc.). Nodes, even basic nodes, are created with this basic concept. Nodes for data access, for example, are essentially wrapped third-party database drivers. Custom nodes can be inserted and integrated using the generic template node 65.

For example, a third-party aerial drone technology can be integrated at 3 in FIG. 1 as a third-party software product. For example, a future software package is in use in a first counter IED military vehicle engaged in a mission to located IEDs (improvised explosive devices). In such a role the crew of the first military vehicle can engage in fortuitous opportunism in accordance with the hitherto unknown capabilities of the present invention. For example, by a fortunate coincidence a second counter IED military vehicle is operating near the first military vehicle. The crew of this second vehicle is using a new and recently deployed high-definition IED detection system. The system as installed on the second military vehicle, which is not found on the first military vehicle, scans the ground using high definition image capture equipment to detect ground disturbance caused when the enemy buries IEDs in the ground. The crew of the first military vehicle decides they want to integrate the high image definition functionality and analysis thereof and does so by carrying out the following steps: (i) requests and wirelessly receives raw high-definition images from system in the second vehicle; (ii) downloads a node that automatically installs a third-party high-definition image analysis software package to analyze the high-definition images obtained by the crew on the second vehicle; (iii) installs this third-party software package at, for example, 3 in FIG. 1 by using the dragging protocol as described above to enable the crew in the first military vehicle to analyze the raw high-definition feed obtained by the crew on the second vehicle; and (iv) outputs the results from the third-party software package at output 6 (FIG. 1).

Output nodes, similar to data source nodes, are selected as required to connect to external systems. These nodes connect to data sources as required and may include, but are not limited to databases, SAP® and REST® services, and custom legacy systems. Output nodes to databases, Soap and REST services function in the same fashion as input nodes. Other output nodes may include functionality for post processing or display as required. For example, an output node may process a model's final data into a KML overlay for a mapping application.

It should be understood that the present invention is not limited to a specific third-party software package. For example, third-party software packages for providing additional processing of raw data at 3 in generic template node 1 can be third-party software packages for analyzing raw data from: a ground penetrating radar system, a metal detector system, a laser-induced breakdown spectroscopy (LIBS) of side-of-road surfaces to detect variations in surface chemistry that arise as a result of digging to plant a road-side IED; LIBS is described in U.S. Pat. No. 7,717,023 issued to Pereira et al. U.S. Pat. No. 7,717,023 is incorporated by reference herein in its entirety. In addition, it should be understood that the insertion of third-party software package into generic template node 65 is not limited to detection of IED, but may be any third-party software package determined to be useful in processing data of interest to the user, such as a novice user.

Dragging Protocol

A novice or professional programmer can integrate a third-party software package into a generic template node 65 and thence insert the resulting work node 10 into a model 5. For example, in one embodiment, a third-party software package is added to a model by dragging an icon representing the software package over an icon representing a generic template node adds the software package to the generic template node whereupon the input and output channels are defined based on the input and output requirements of the third-party software package to create a working node (or integrated node) that contains the third-party software package. It is preferred that the third-party software package itself defines its input and output channel requirements.

The working node (or integrated node) is inserted into a model 5 by dragging an icon representing the working node (or integrated node) to rest over a connector whereupon the working node (or integrated node) is integrated at that point in the model. A working node (or integrated node) may also be dragged to an empty part of the screen and connected later manually. The connector directs input into the working node (or integrated node) from an upstream node or data source, and the connector directs output of processed data from the working node (or integrated node) to a downstream working node (or integrated node) such as a working node (or integrated node) tasked to direct output to a printer or storage device. Upon integration of the third-party software package into the model the novice user is able, for example, to analyze the upstream data source, which can be raw data such as raw data received wirelessly from a remote ground penetrating radar system. The system of modifying (i.e., converting) generic template nodes into working nodes (or integrated nodes), and dragging to integrate a third-party software package and selecting input and output has never hitherto been provided in the prior art of modular software development.

Third-party software packages may be downloading wireless from a secure data source via, for example, satellite. As should now be understood, this capability intrinsic only to the present invention has the unexpected benefit of allowing phenomenal flexibility and focused processing power for rapid development and deployment of models. For example, in active combat missions in real time in fast moving and extremely challenging circumstances in enemy infested hostile areas. Each time a third-party software package is downloaded details of the download can be sent wirelessly up the chain of command to a remote facility designated with the mission to record use of third-party software packages thereby providing feedback on the popularity of third-party software packages.

In one embodiment, at least a portion of the third-party software packages have an embedded time-fuse which allows use of the third-party software package for a limited time thereby requiring a user to download a favored third-party software package to provide feedback on the actual amount of use of the third-party software package. In one embodiment one or more third-party software packages are downloaded from the cloud to be integrated into a model 5 has an embedded time fuse that optionally display countdown expiry warnings. Such information would also help with determining the amount of money, i.e., for calculating compensation to be paid to the vendors of third-party software packages. In a preferred embodiment the time-fuse can be tolled, such as by entering a toll code, to avoid loss of use of a third-party software package while in use during an active mission.

Referring in more detail to FIG. 1, working nodes (or integrated nodes) 10 serve as the fundamental building blocks of models of the invention. Nodes contain at least one process. From the perspective of an exemplar working node (or integrated node) having one process, the process may be derived from a node library (canned common functions like, but not limited to, Sum and Average), custom user generated code or a wrapped third-party technology. Each node represents a distinct verifiable process. A Node has multiple user defined inputs and outputs defined as generics and supporting any data type as needed. Nodes are threaded and may run in parallel with one another. Internal functionality of a node is defined in items 70 through 200 and in FIG. 2.

It should be understood that some nodes need not result from modification of a generic template node 65. For example, output nodes that direct output, for example, to a printer may be provided as part of the generic template node 65 or from a library.

Figure 4:
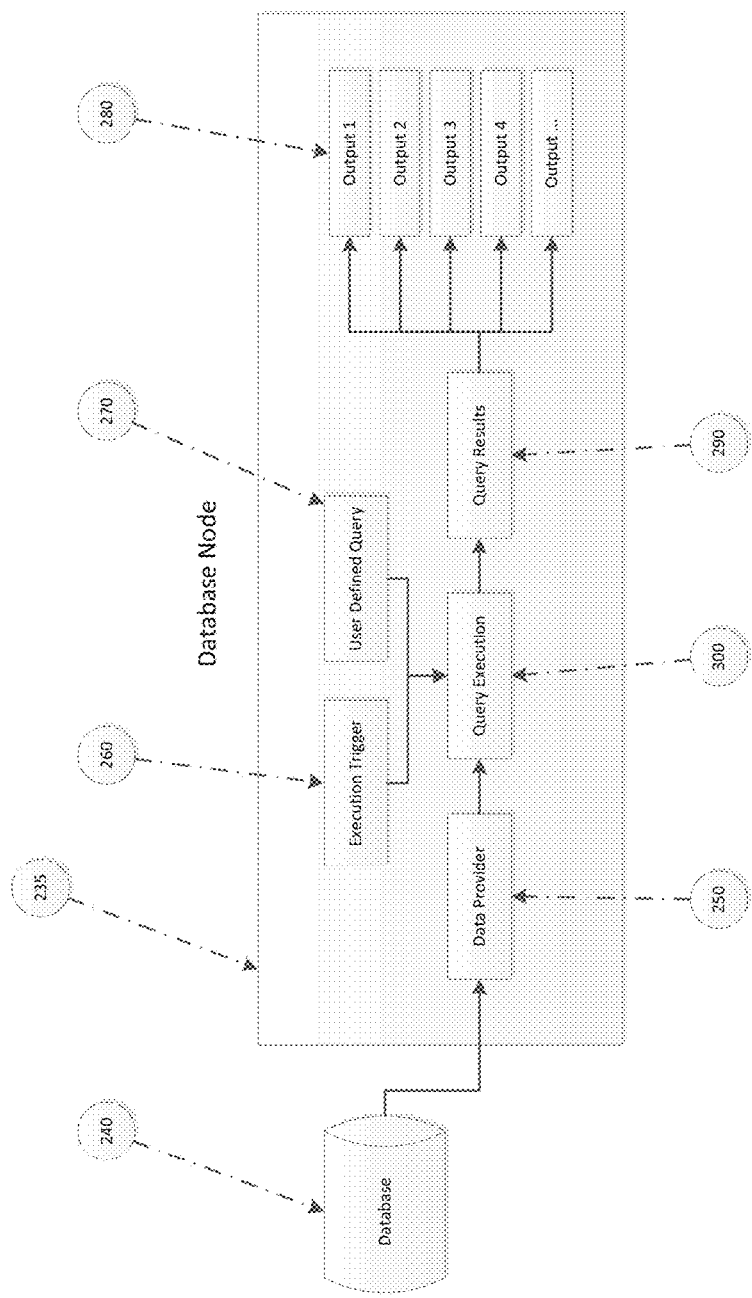
FIG. 4 is a schematic of an example database node derived from a generic template node of the present invention.
Figure 5:
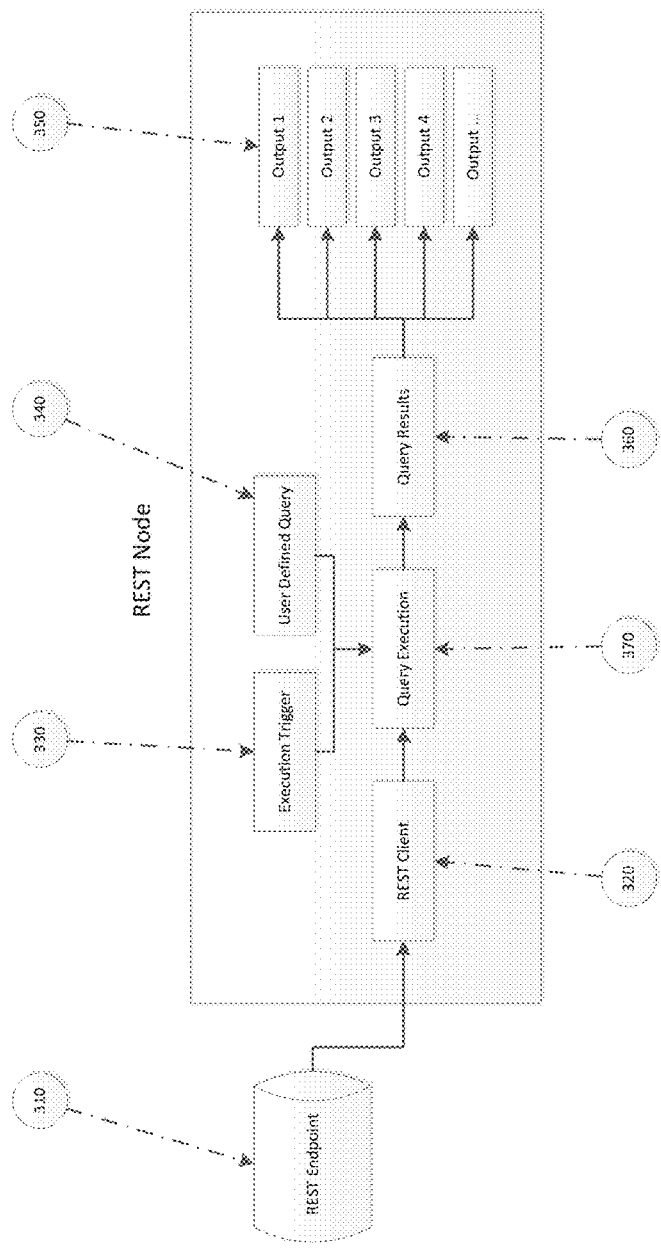
FIG. 5 is a schematic of an example of a node derived from a generic template node of the present invention.

Still referring to FIG. 1, data is provided to a model 5 by way of dedicated data sourcing nodes 20. These nodes connect to data sources as required and may include, but are not limited to databases, SOAP and REST services, and custom legacy systems. Data nodes are implemented in several ways depending on the source. Data nodes that access a database directly implement the database manufacturers' provider mechanisms. Service sources, like SOAP and REST, are accessed with system specific providers that are tailored appropriately for the endpoint design. As a result, data may be provided in simple row structure, as in many databases, or in more complex object based formats especially with respect to SOAP services. FIG. 4 shows and example of a database node using a standard data provider and a user defined query that copies returned data to channel outputs. FIG. 5 shows and example of a REST node using a standard HTTP REST client and a user defined query that copies returned data to channel outputs.

Figure 6:
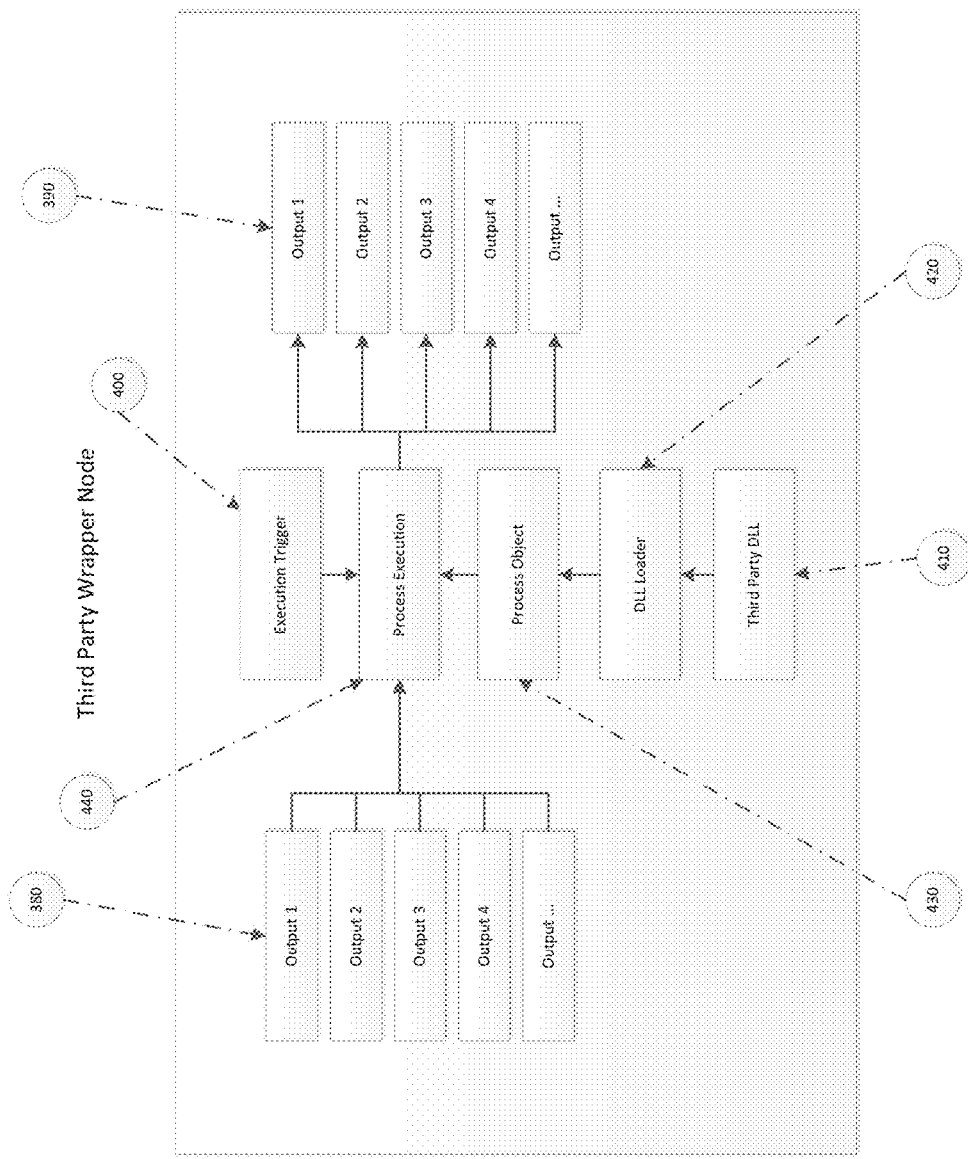
FIG. 6 is a schematic of a third-party wrapper node derived from a generic template node of the present invention.

Third-party technologies 30 may be wrapped within a generic template node to create a working node (or integrated node) for simple implementation and integration into a model 5. This may include code or compiled libraries and executables (Matlab, Neurosolutions, etc.). All nodes, even basic nodes, are created with this basic concept. Nodes for data access, for example, are essentially wrapping third-party database drivers. Custom nodes use the same concept to wrap custom code within the Nodes standard operating framework. FIG. 6 show a node that load a third-party DLL, initializes an object from the DLL and execute the DLL to process input data to output data.

Figure 3:
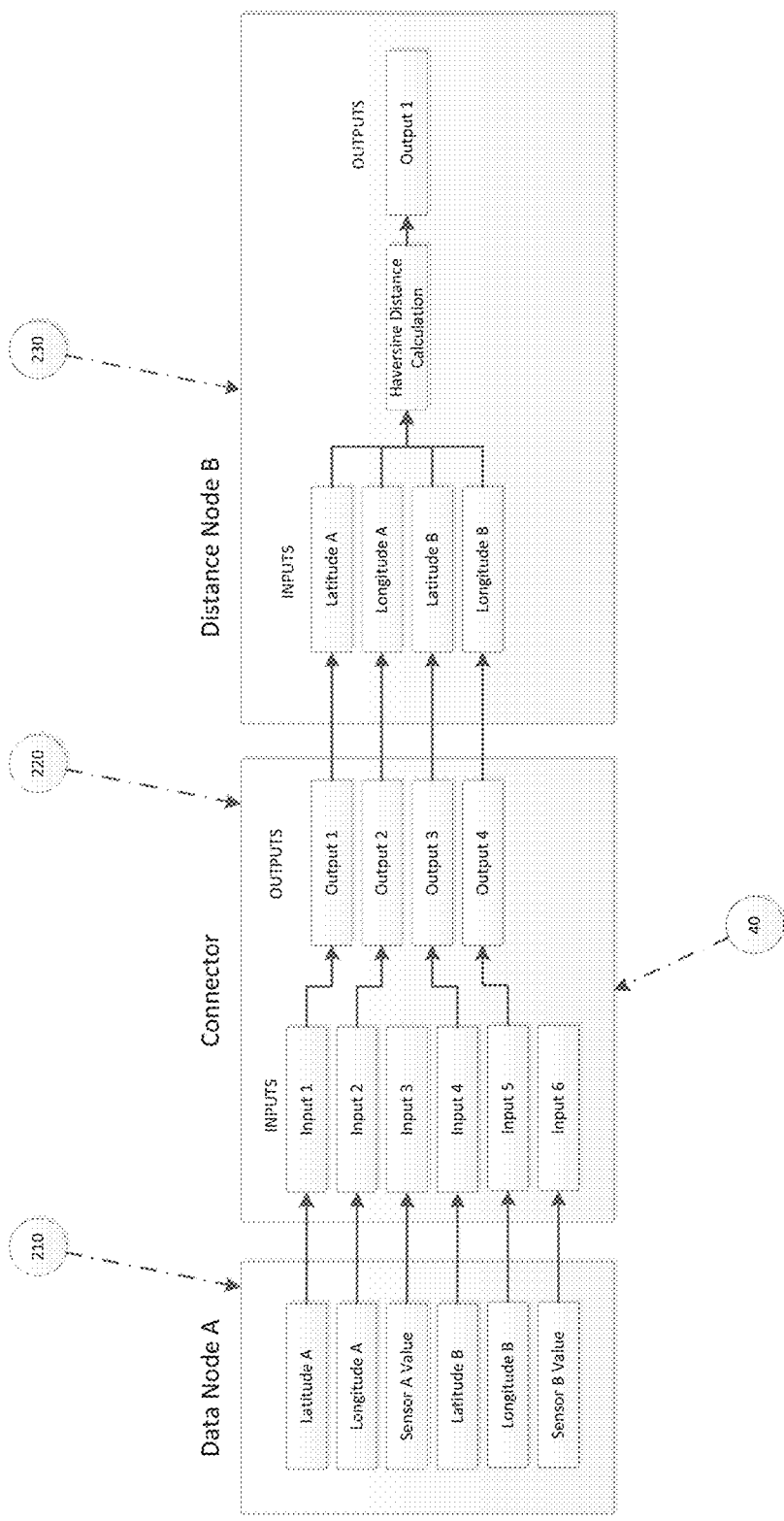
FIG. 3 is a schematic of an example connector.

Connectors 40 provide a simple visual method to select data flow through the Model. A Connector maps specific inputs on one Node to specific outputs on another Node. Connectors may be used between any Nodes. Connectors allow users to select specifically where each input and output is connected, thus defining the data flow through the nodes. This is especially useful for users with a wide data set, where only a few channels need to be mapped to various nodes. FIG. 3 show an example implementation of a connector between two nodes with partial channel connectivity.

Figure 13:
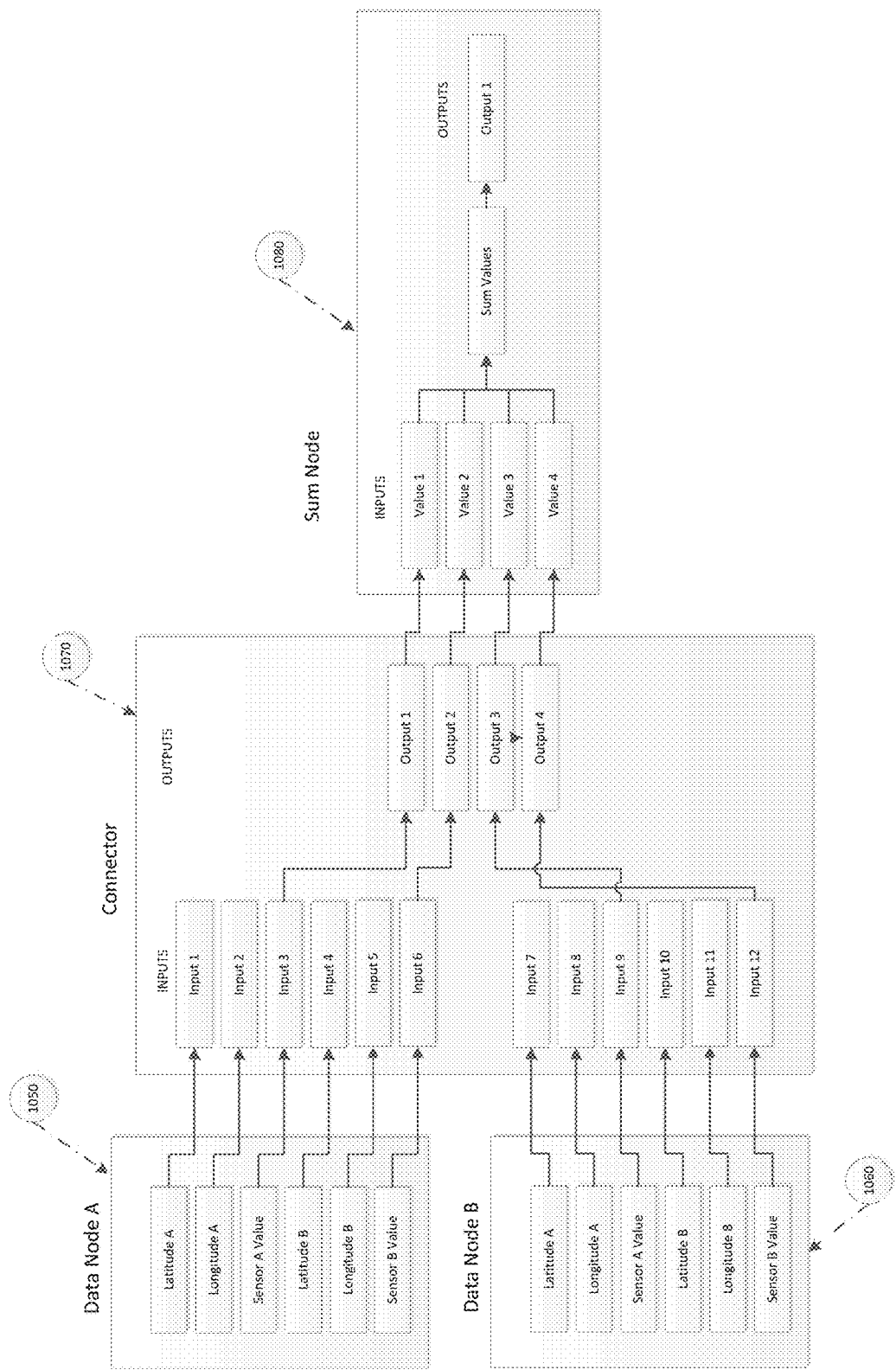
FIG. 13 is a schematic of a canned common function, in this example a canned Sum Node function, according to the present invention.

Single Nodes 50 may accept input from various upstream nodes. A Node may accept input from several Nodes, process the data, and present the output data on a single set of output channels. For example, a Node that sums to values of two channels into one channel will have two inputs mapped to two upstream nodes and one channel mapped to one Nodes input. The same is functional in the inverse in that any single node output may be mapped to many other Nodes' inputs. FIG. 13 show an example Sum Node that adds together values from two different nodes.

Output Nodes 60, similar to data source Nodes, are selected as required to connect to external systems. These nodes connect to data sources as required and may include, but are not limited to databases, SOAP and REST services, and custom legacy systems. Output nodes to databases, Soap and REST services function in the same fashion as input nodes. Other output nodes may include functionality for post processing or display as required. For example, an output node may process a model's final data into a KML overlay for a mapping application. See FIG. 14 for an example of a database output node derived from modifying a generic template node of the invention. This node is essentially the same as the database input node, but runs an Insert query rather than a Select query.

FIG. 2 shows a schematic of a generic template node 65. Generic template nodes 65 function as templates which upon modification create working nodes (or integrated nodes) 10. Nodes in a Model (algorithm) are controlled via an external process 70 called the Model Host Process (also referred to as "host process"). This process is responsible to scheduling the setup initialization and processing routines of the Nodes. When initially executed, each Node is instructed to setup any variables or processes it needs. In addition, the Model Host Process coordinates to overall execution order and triggering for all nodes within a Model.

The Model Host Process 70 signals each node at 80 to indicate setup initialization and processing. Initialization occurs, for example, when a Model is loaded for the first time. Processing is signaled from the external process to coordinate parallel threads. Each node is notified of the execution event from the Model Host Process and then triggers its own internal thread to execute its specific functionality. See FIG. 7 for the Model Host Process Initialization. During initialization a Model's structure may defined from memory or from file storage. See FIG. 10 for Model Host process Execution.

During the initialization process, the system defines and initializes all required input and output channels at 90. This function may be overridden by user defined code. When overridden, this process allows Node Designers to request custom input and output channels for a node. See FIG. 8 for Node Initialization. During the initialization process, the system also defines and initializes all required internal variables 100. This function is hidden from users. Each node has a set of predefined objects that must be initialized before use, like the base object arrays for inputs and outputs and internal timing variables. See FIG. 8 for Node Item Initialization.

During the initialization process, creates at least one thread 110 for each node. This thread will be signaled by the Model Host Process when the node is required to execute. This function is hidden from users. Because each node contains its own thread, many nodes may be executed in parallel depending on the overall Model design. See FIG. 8 for the processing order of Thread Initialization within a node.

During the initialization process, the system defines and initializes all required user defined user defined variables and/or third party components 120. This function may be overridden by user defined code. Node designers may require local variables for custom functionality and this function will initialize them before use. This is especially useful for variables that may be shared within several custom functions within a single node. See FIG. 8 for the processing order of User item initializations.

Incoming data 130 is provided to a Node from an upstream connector. All data between nodes are assigned by connectors. Connectors are generic and channels assignments implement the Type of the channel being handled automatically. See FIG. 3 for an example of a connector channel mapping in use. See FIG. 9 for the Channel initialization process.

User defined inputs are organized into a set of input channels 140, separate from the Model Host Process control inputs. These inputs will accept data from other nodes via connectors. These inputs are data only and Node commands are not accepted on these inputs.

Input channels are user defined and are generic. Each channel 150 may be assigned a data type that is defined by a Node Designer. Within the Nodes base object, channels are defined as Generic and assigned a Type at runtime rather than compilation. This flexibility allows a node to support an open ended array of possible object types from traditional simple native objects like Integers and Strings, to more complex data structures like datasets or even hierarchical object arrays. See FIG. 9 for Channel initialization. To make this possible Channels are defined as a generic object of Type "Channel<T>". In accordance, all supporting processes internal to a channel operate on Type "Channel<T>". As a result, Channels may be defined in any require type as in "Channel<int>" for an integer number type or "Channel<float>" for a floating point number type. Channels accept any Type during definition and node designers may even using custom Types as long as all Types are available at runtime, for example "Channel<MyCustomDefinedType>" as a definition.

A Process routine 160 contains the function code of the node. The Process Routine is triggered by the Model Host Process. This function is the main operational process for a node. See FIG. 11 for Node Execution.

After accessing the input data, the Node may run custom code, canned routines, or may wrap a third-party component or DLL at 170 and instruct this external code the run. It is within this process that input channel data will be accessed, processed and then applied to output channels. This process may contain generic logic like database connectivity, or more complex mathematical functions like clustering, computer vision or artificial intelligence implementations. See FIG. 6 for an example of a node using a third-party DLL.

User defined outputs 180 are organized into a set of output channels, passing data to a connector and to downstream nodes or output systems. See FIG. 13 for an example of node outputs mapped to a downstream node. Output channels 190 are user defined and are generic. Each channel may be assigned a data type are defined by the user. Output channels are defined and generated in the same fashion as the input nodes. See Item 15 (above) for details on generic channel initialization.

Output data 200 is passed to downstream nodes or output to an external system. When connected to an output node, like a database or REST service node, output data is provided directly to the downstream system. See FIG. 14 for an example database output node.

FIG. 3 shows an illustration of the role of a connector 40. A connector is shown placed between data node A and data node B. In this example each of data nodes A and B were separately derived from modifying a generic template node. The connector shown in FIG. 3 maps the output data from data node A to the input side of data node B. For illustrative purposes, in this example there is not a one-to-one relationship between the inputs and outputs of nodes in a model.

Specifically, FIG. 3 shows an example implementation of a connector between two nodes with partial channel connectivity as opposed to full one-to-one connectivity. More specifically, the first node, Data Node A, provides latitude, longitude and data values from two sensors at 210. The connector at 220 in FIG. 3 maps only the latitude and longitude values to the second node at 230 because these are all that is required for a distance calculation made by a custom process wrapped in the second node, i.e., Distance Node B. Put another way, the second node, Distance Node B, is configured to only accept latitude and longitude values as inputs at 230. Distance Node B then calculates the corrected distance around the curved surface of the earth between two points. Data Node A and Distance Note B both having separately been previously obtained by modifying the process routine component 160 of a generic template node (see FIG. 2). Therefore, it should be understood that Data Node A and Distance Note B are examples of working nodes (or integrated nodes) 10.

In FIG. 4 an exemplar working node (or integrated node) in the form of a database node 235 is designed to provide database connectivity. Database node 235 is obtained by modifying a generic template node and thus inherits its base capabilities (i.e., implemented on a copy of the generic template node). Database node 235 is operably linked to an external database 240. A Database provider 250 is an object implements database specific provider. More than one provider may be available. The database provider exposes basic database connectivity over which queries will be executed. The database node 260 comprises an execution trigger 260, which is a function inherited from the generic template node. As a result, the node 235 processes when triggered by its parent model process. The terms "host model process" and "parent model process" are regarded as equivalent terms and are used interchangeably.

A User Defined Query is provided at 270 with respect to which a public parameter is defined that allows users to define a query to execute at run time. Standard output channels are defined at 280 to support query results. Query results are copied to output channels at 290. Query execution takes place at 300 when triggered by the execution trigger feature of the generic template node which is inherited by the working node (or integrated node) (i.e., in this illustration, database node 235). This function uses the user defined query and executes against the appropriate database using the database provider.

FIG. 5 shows an example of working node (or integrated node) in the form of a REST Node 305. This node is implemented (i.e., developed) by modifying a copy of the generic processing node and thus inherits its base capabilities. This node has an external parameter for query definition and processes requests when triggered. This node is very similar in function to the example database node. Several features are associated the REST Node 305 including an External REST data source 310, and a REST Client 320 for handling URL requests and parsing returned results. REST Node 305 includes an execution trigger 330, which is inherited from the generic template node. As a result, the node will process when triggered by its parent Model process. A User Defined Query 340 incorporates a public parameter that is defined such that it allows users to define a query to execute at run time. Standard output channels are defined at 350 to support query results. Query results are copied to output channels at 360. Query execution takes place at 370 when triggered by the execution trigger. This function uses the user defined query and executes against the appropriate database using the REST Client.

FIG. 6 illustrates an exemplar Third-Party Wrapper Node in which wrapping (i.e., integration) of third-party components is provided. This node has a predefined structure to support the loading of third-party, externally developed Dynamic Link Libraries (DLLs). These external DLLs may contain processes for various functionality, but usually the individual designing the node will not have access to source code of the DLL. This occurs most often when components are purchased from a third-party to provide specific functionality, but only a compiled DLL is provided. Standard input channels are defined at 380 to support DLL requirements. Standard output channels are defined at 390 to support DLL requirements. An Execution Trigger is provided at 400; this function is inherited from the parent generic template node. As a result, the node will process when triggered by its parent Model process. The third-party DLL is usually available as a file at 410. The DLL is loaded at 420 by a DLL loader and functions are now available in memory. The DLL is wrapped and made available as an object at 430 to handle access to unmanaged functions and objects that may be available within the DLL. The standard process execution routine in executed at 440. Within this function an individual designing this node may call various functions or implement various objects available within the DLL.

Figure 7:
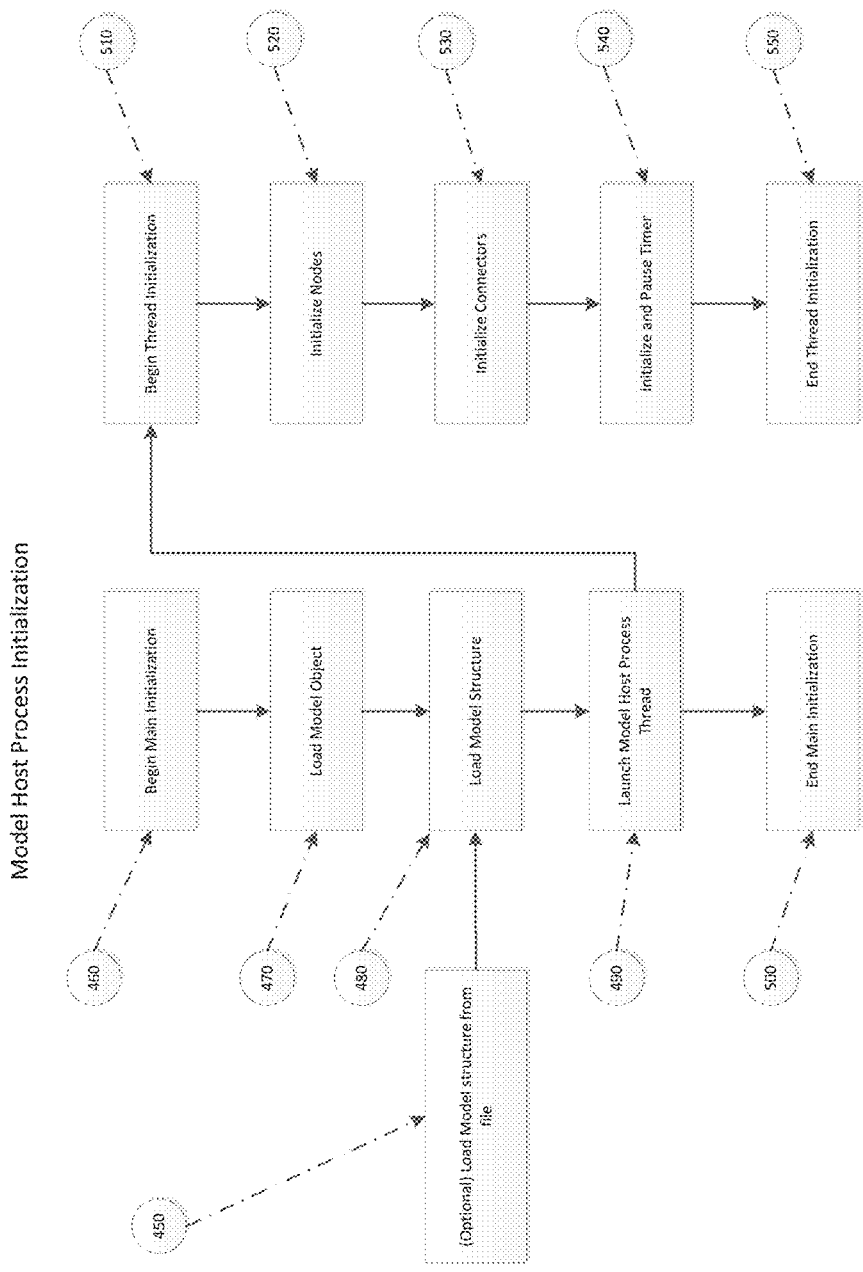
FIG. 7 is a schematic of an example of a host process controlled initialization of a model.

FIG. 7 illustrates an example of a Model Host Process Initialization. The Model Host Process is the main process that triggers all nodes and connectors to execute. This object contains a timer object, an execution thread and array of all nodes and connectors contained within the model. Each of these objects must be setup and initialized for use. This figure describes this process and the steps involved. A Model Structure is optionally loaded at 450.

Still referring to FIG. 7, a model structure may be loaded from a saved file, but if not loaded an empty model will be created. Main Initialization begins at 460. The starting thread begins. This thread is only responsible for loading objects and will terminate after the Model Host Process thread has started. The main Model Object is loaded at 470 at which point the Model Object will be empty. If a Model file was provided when starting, the model structure will be applied from the file at 480. Otherwise the Model will be empty and will not contain any nodes or connectors. Launch Model Host Process Thread occurs at 490. Once the Model Object has been loaded and optionally filled, the Model Object is provided to a new thread to support execution of the Model.

Main Initialization terminate at 500. At this point the main initialization thread is complete and focus will return to the main application thread, leaving the Model Host Process Thread running as a background process. Thread initialization begins at 510 where the Model's main thread begins. This thread is only responsible for triggering and timing execution of all contained node and connectors currently assigned to the model.

Nodes are initialized at 520. The thread loops through all node objects and trigger each item's initialization routine.

Connectors are initialized at 530. The thread loops through all connector objects and trigger each item's initialization routine. A pause timer is initialized at 540. The thread then initializes and pauses a local timer that will be used for polling operations, particularly with respect to data sources. End Thread Initialization occurs at 550. Thread and objects are now initialized. The thread is paused by a local timer and a timer activation signal. When signaled, the timer will emit event notifications on a scheduled basis to trigger operations within nodes and connectors.

Figure 8:
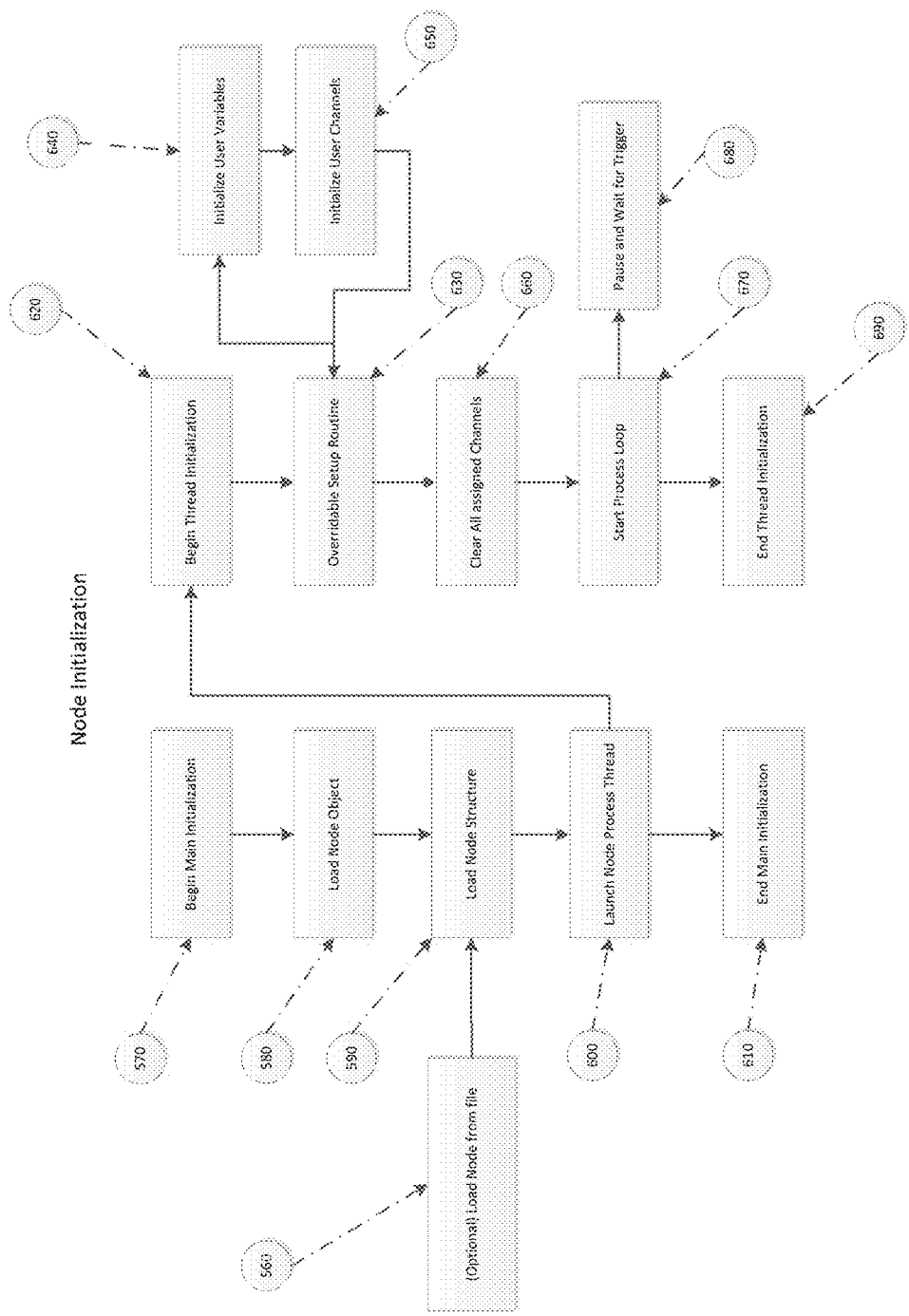
FIG. 8 is a schematic of a node initialization, according to the present invention.

FIG. 8 illustrates Node Initialization. Node initialization must occur before a node may be used. During this process the node structure us setup and all user defined variables and channels will be created. A node is optionally loaded at 560. Node structure may be loaded from a saved file, but if not loaded an empty node will be created. Main Initialization begins at 570. Load Node Object is loaded at 580. Specifically, the main Model Object is loaded. The node is empty prior to loading. Load Node Structure is loaded at 590. If a Model file was provided when starting, the model structure will be applied from the file. Otherwise the node is empty and therefore will not contain any functionality.

Node Process Thread is launched at 600. Once the node object has been loaded and optionally filled, the node is provided with a new thread to support execution of the node. Main Initialization ends at 610. At this point the main initialization thread is complete and focus will return to the main application thread, leaving the Node Process Thread running as a background process. Thread Initialization begins at 620, this is where the node's main thread begins. This thread is responsible for processing in the working node (or integrated node).

Overridable Setup Routine 630 allows a user to modify a generic template node and thereby convert it to a working node (or integrated node). This is particularly useful because after modifying the Setup Routine 630 there is no per se requirement to use a compiler to obtain the working node (or integrated node). The overridable Setup Routine is responsible for initializing all user defined objects. This routine is usually overridden by an individual designing a custom node and/or wrapping a third-party software which is installed at 630. Initialize User Variables are initialized at 640; user defined variables are initialized here. User Channels are initialized at 650; user defined channels are initialized here. All assigned channels are cleared at 660; channels requested in the Setup Routine are zeroed and readied for usage.

The node's local processing thread starts at 670. This thread runs a loop that will continue until terminated. Pause and Wait for Trigger—The node's processing thread pauses at 680 subject to being triggered by the parent model. Thread Initialization terminates at 690.

Figure 9:
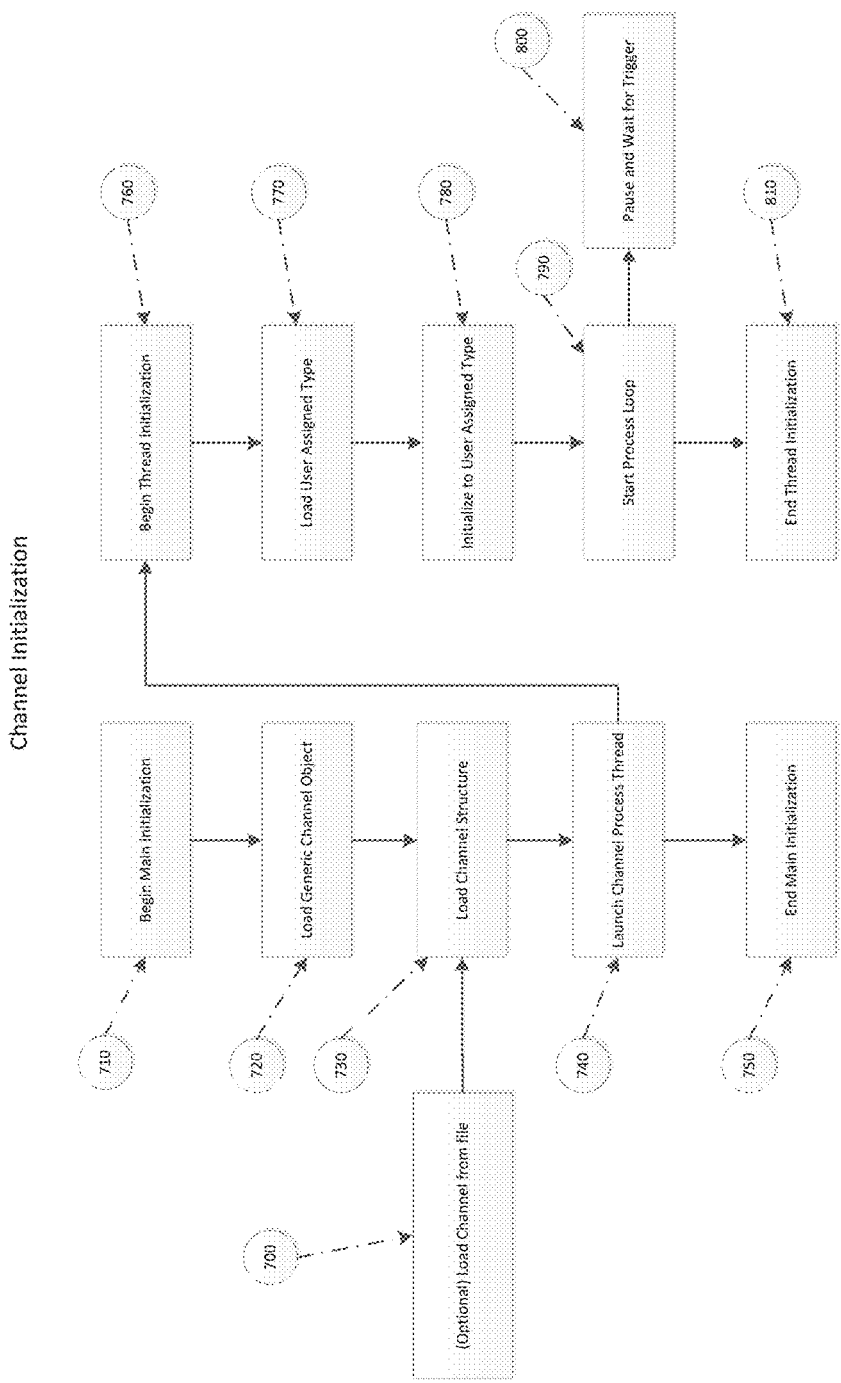
FIG. 9 is a schematic of a channel initialization, according to the present invention.

FIG. 9 illustrates the steps involved in an exemplar Channel Initialization. Channel initialization occurs typically before a Channel is used. Channels are defined by individuals who designed each node. Each channel is automatically created based on the type defined by the user.

Channel Structure is loaded from a File at 700. This step is optional. Channel structure may be loaded from a saved file, but if not an empty channel results.

Main Initialization begins at 710 whereupon the starting thread begins. This thread is only responsible for loading objects and will terminate after the channel processing thread has started. Channel Object is loaded at 720, and upon loading, the channel is rendered empty.

Channel Structure is loaded at 730. If a Model file was provided when starting, the model structure will be applied from the file. Otherwise the channel will be empty and will not contain any functionality.

Channel Process Thread is launched at 740. Once the channel object has been loaded and optionally filled, the channel is provided to a new thread to support execution of the channel.

Main Initialization ends at 750. At this point the main initialization thread is complete and focus will return to the main application thread, leaving the Channel Process Thread running as a background process. Thread Initialization begins at 760. More specifically, the channel's main thread begins. This thread is only responsible for processing.

User Assigned Type is loaded at 770. Channel data Types are defined by the user. This is accomplished by defining the main channel object as a "Generic" that accepts data types at runtime. Most data Types will be native, like integer or string for example, but some may be complex objects or even custom objects that must be loaded at this step.

User Defined Type is initialized at 780. The Channel will now initialize its own data type to the type requested by the individual who designed the node containing the channel. Because the "Generic" definition is now replaced by the specific data type definition the channel will take all attributes from the data type.

Process Loop starts at 790. The channel's local processing thread starts. This thread runs a loop that will continue until terminated. The Channel's processing thread pauses here subject to being triggered by the model this node is a part of. End Thread Initialization—Initialization of thread and objects is completed at 810.

Figure 10:
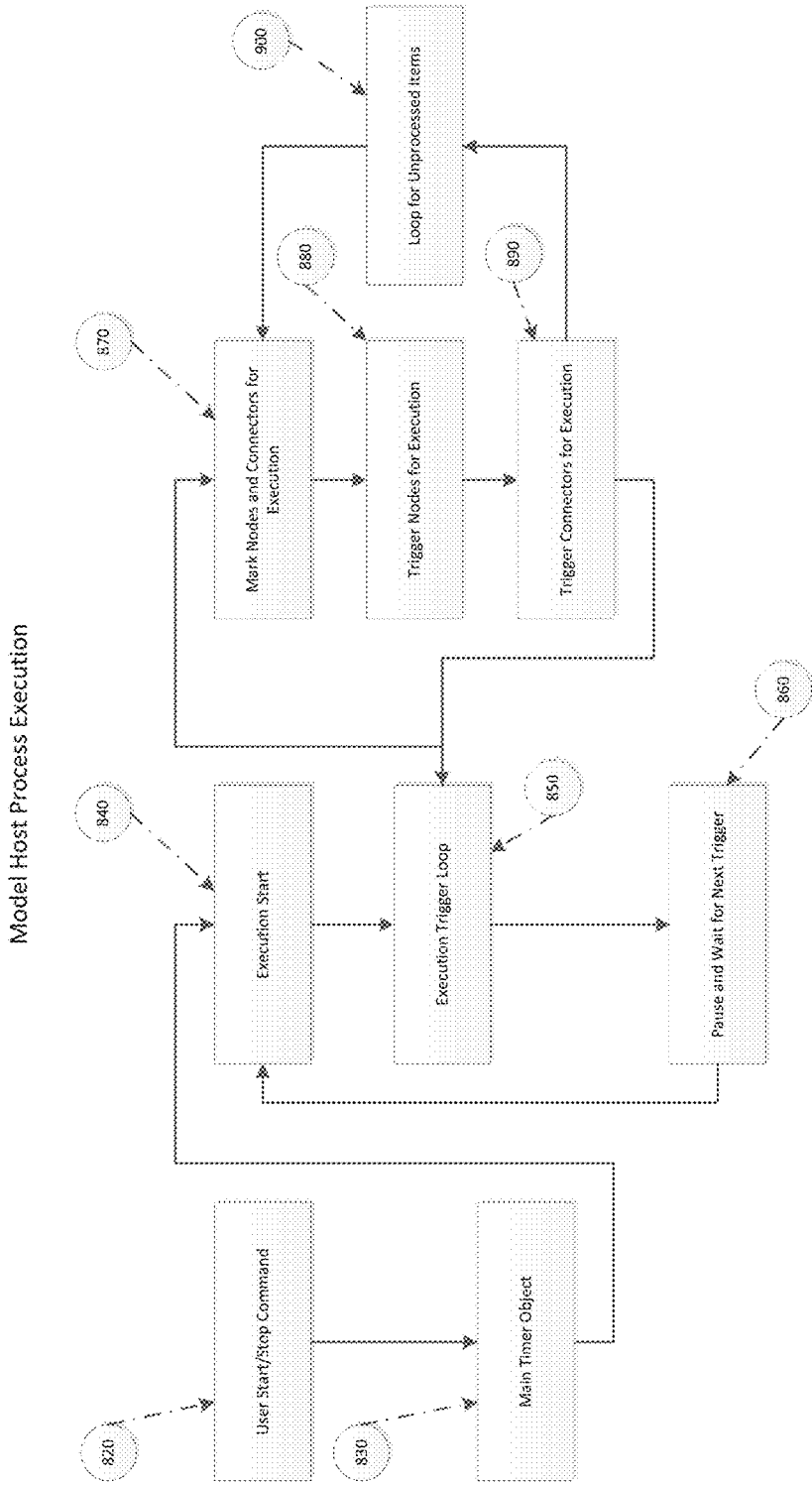
FIG. 10 is a schematic of a Model Host Process Execution, according to the present invention.

FIG. 10 provides an exemplar of Model Host Process Execution. Once the Model Process has been initialized, including all contained nodes and connectors, the Model Host Process executes. This process coordinates the execution of all nodes and connectors. Specifically, the triggering of data handling through connectors and processing functions in each node are ordered and scheduled. The process accepts start and stop commands at 820 from the user(s). This command will start or stop the main timer.

The main timer object at 830, when started, will emit event notifications that the process will use to trigger node and connector execution. Execution start is triggered at 840, and the process thread executes objects.

Within an Execution Trigger Loop at 850 the execution of each individual node and connector is triggered in the appropriate coordinated order.

Pause and Wait for Next Trigger at 860. Once the execution loop has completed, the thread will pause and wait for the next event notification form the main timer object. Within the execution trigger loop at 870 each node is processed in appropriate order. This function is responsible for detecting which nodes have already been executed and which nodes are required to execute next. This is determined by a standard parent/child relationship between nodes. All nodes that marked for execution are triggered at 880.

All connectors that have been marked for execution are triggered at 890. Loop for unprocessed items is found at 900. After executing the marked objects, there may be additional objects now available to trigger. This function will loop until all objects within the model have been triggered and executed.

Figure 11:
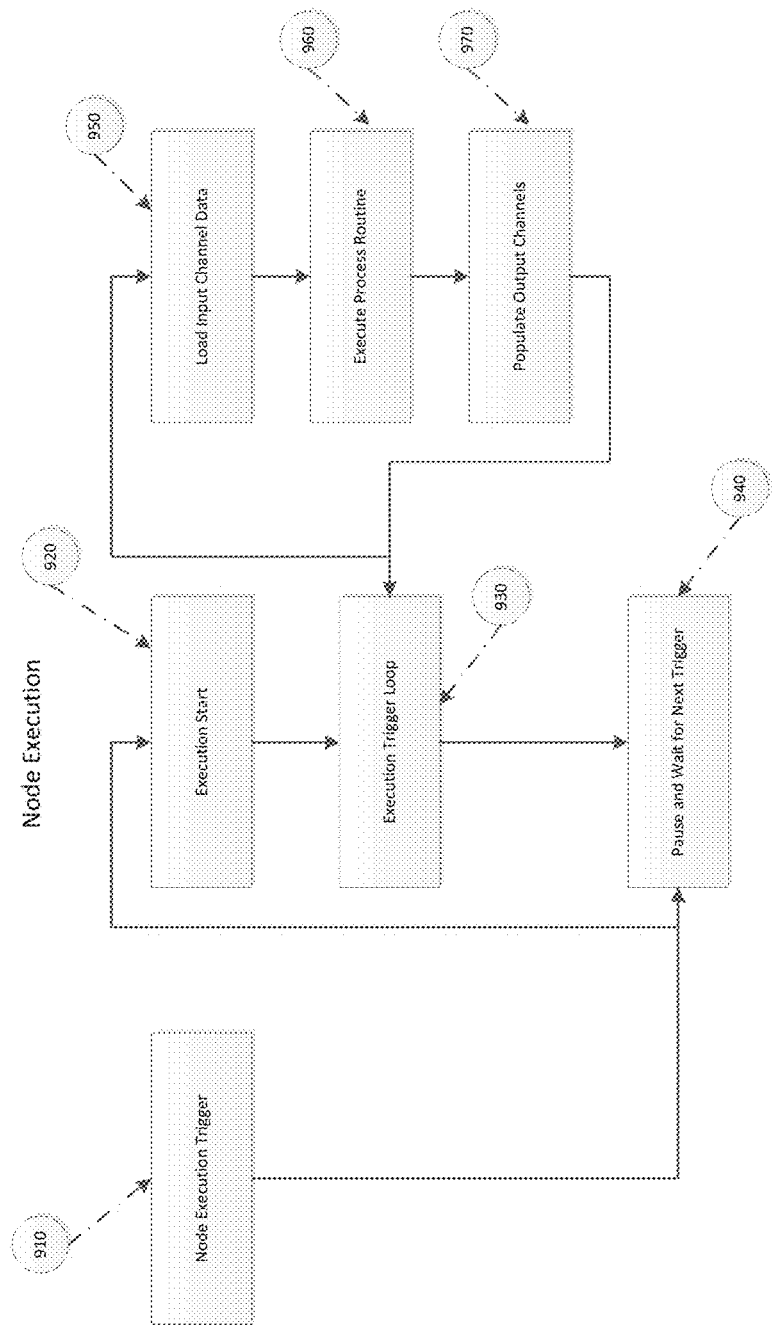
FIG. 11 is a schematic of a Node Process Execution, according to the present invention.

FIG. 11 illustrates the steps involved in an exemplar Node Execution. When triggered from the main Model Host Process Thread, each node must execute its own internal processes. Like the Host Process, each node contains its own thread for the purpose of allowing multiple nodes to execute in parallel on hardware that supports multithreading. The node receives a Node Execution Trigger at 910 from the hosting model process. Execution starts and the execution trigger loop is entered at 920. The execution trigger loop at 930 is responsible for execution data copies from input channels, to output channels and the execution of the node's main process routine. Once completed the local thread pauses at 940 and waits for the next trigger from the host process.

Input Channel Data is loaded at 950. Within the execution trigger loop, the data from the input channels must first be accessed and made available to the node's process routine. This occurs by way of the channels "Generic" data type functions.

Process Routine is executed at 960. This function is usually overridden by the individual who designed the node to execute some specific functionality.

Populate Output Channels are populated at 970. When the node's execution process routine is complete, the output data is copied to the output channels and made available to downstream connectors and nodes.

Figure 12:
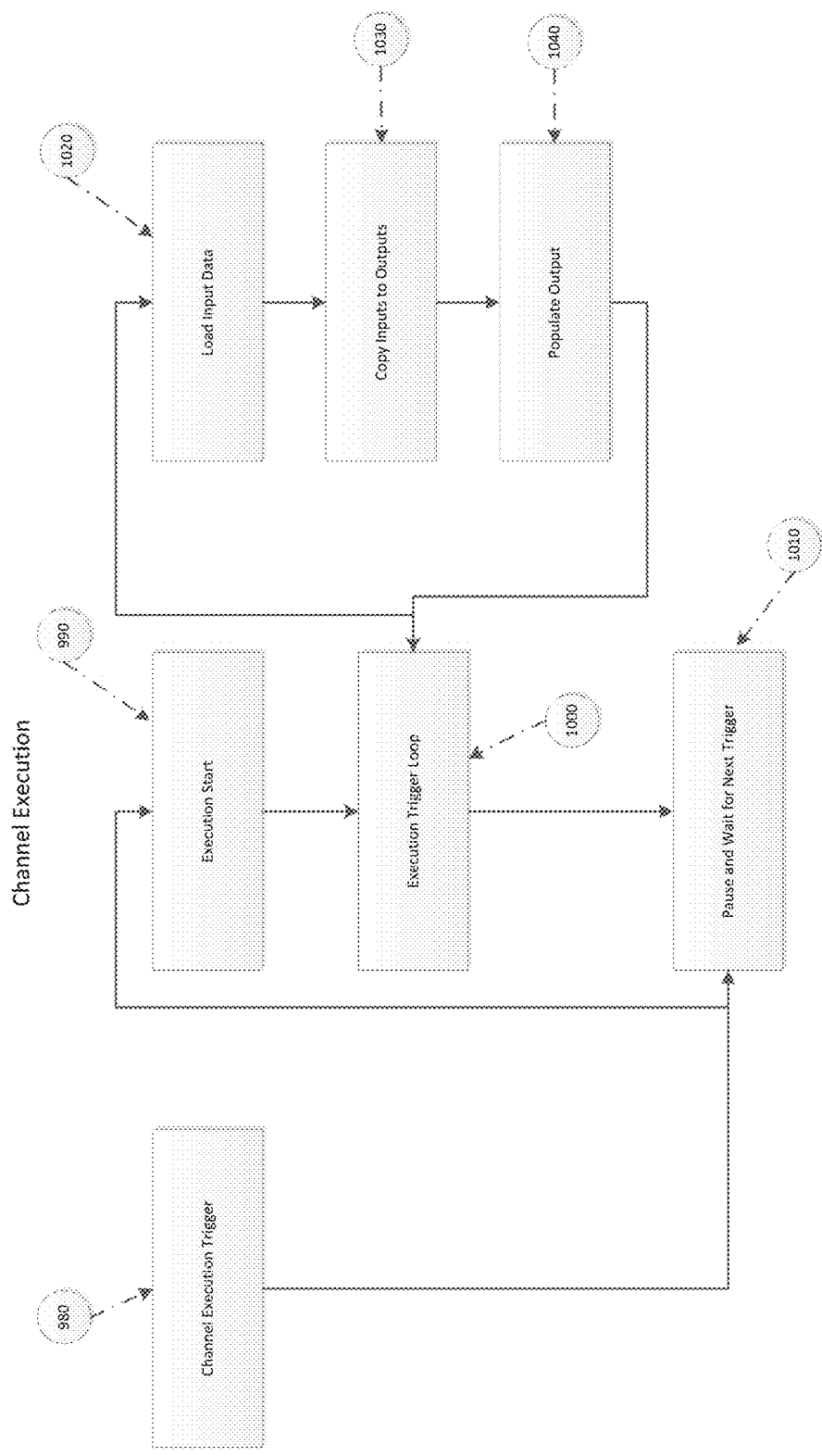
FIG. 12 is a schematic of a Channel Process Execution, according to the present invention.

FIG. 12 illustrates the steps involved in an exemplar Channel Execution. When triggered from the main Model Host Process Thread, each channel must execute its own internal processes. Like the Host Process and nodes, each channel contains its own thread for the purpose of allowing multiple channels to execute in parallel on hardware that supports multithreading. Execution starts at 990 and the execution trigger loop entered at 1000. The execution trigger loop 1000 is responsible for execution data copies from input, to output and the execution of the Channel's main process routine. Once completed the local thread pauses at 1010 and waits for the next trigger from the host process.

Input Data is loaded at 1020. Within the execution trigger loop, the data from the input must first be accessed and made available to the Channel's process routine. This occurs automatically by way of the channels "Generic" data type functions.

Inputs are copied to outputs at 1030. Unlike nodes, a channel simply copies data from and input to an output for passage to a downstream object.

Populate Outputs—Input data is simply copied to the Channel's outputs at 1040 thereby populating outputs, and made available for access by downstream objects. The outputs will be populated by the input data before the Execution Trigger Loop is marked as complete.

FIG. 13 shows a sum node example in which two data nodes, a connector and a functional node are demonstrated. A Sum Node is used to demonstrate the data flow through the structure and show a simple functional element. The Sum Node takes numerical values as inputs as sums them for a total combined value. Specifically, at 1050 Data Node A provides data from a sensor bank of two sensors including latitude, longitude and sensor data values.

At 1060 Data Node B provides data from a sensor bank of two sensors including latitude, longitude and sensor data values. At 1070 the connector only maps the sensor data values to the Sum Node. Positional information is not required to find the total combined value of all four sensor data values. The example Sum Node adds each of the four input values together at 1080 to provide the total sum of inputs as an output channel.

Figure 14:
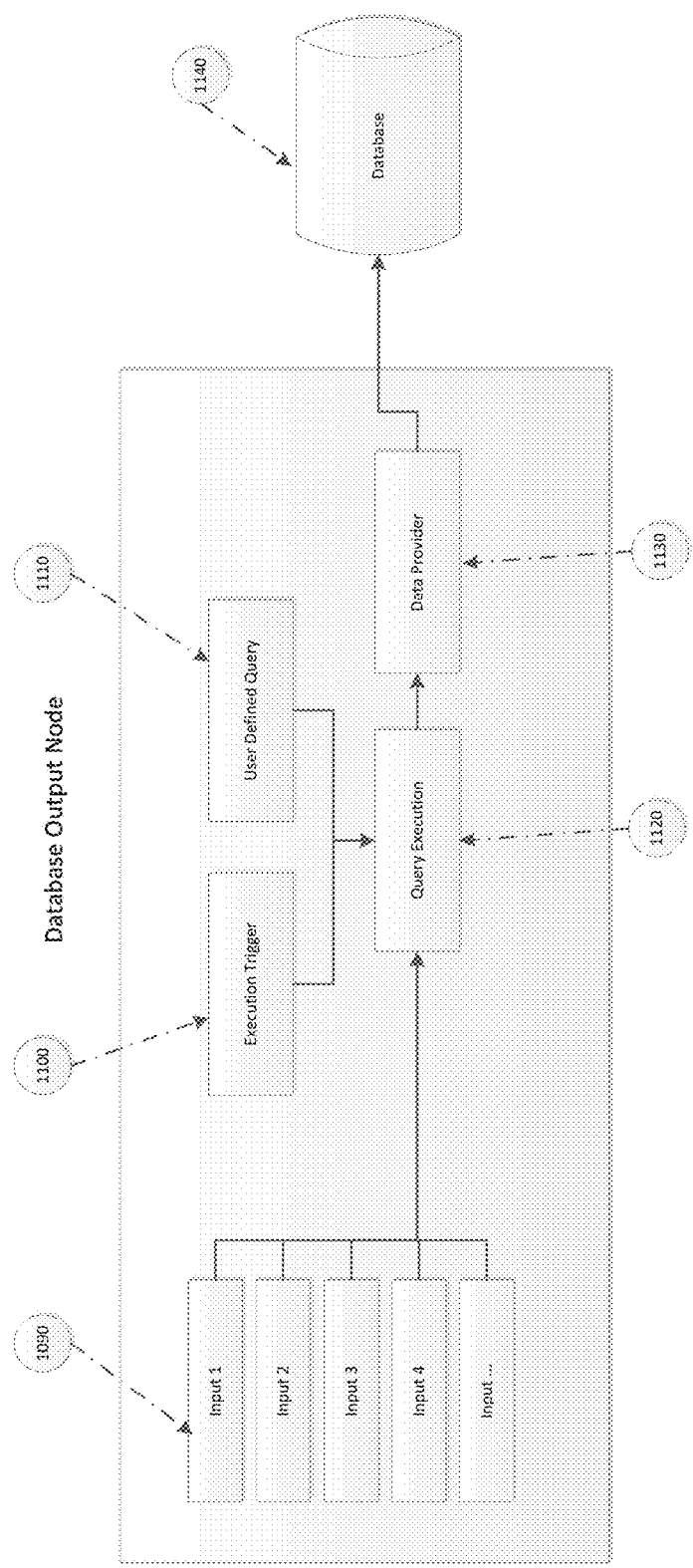
FIG. 14 is a schematic of a Database Output Node, according to the present invention.

FIG. 14 shows a Database Output Nod, which is a specific example of a working node (or integrated node) derived from a generic template node. In most cases, once data is processed it must be provided to an external system of some fashion. This is accomplished in various ways depending on usage. In this example a node will connect to a database to write out its final processed values. This may also be accomplished by a REST, SOAP interface or even more complex output objects like a visual overlay for a mapping application. At 1090 data from upstream nodes arrives at this node via the input channels. An Execution Trigger at 1100 is inherited from the parent generic template node. As a result, the node will process when triggered by its parent Model process.

A public parameter is defined at 1110 that allows users to define a query to execute at run time. Query execution takes place at 1120 when triggered by the execution trigger. This function uses the user defined query and executes against the appropriate database using the data provider at 1130. The database provider exposes basic database connectivity over which queries will be executed. An external database is provided at 1140.

FIGS. 15 through 23 illustrate a method for method of predicting the presence of improvised explosive devices (IEDs) in an external environment.

Often when designing a working Model, live data sources are not available to designers. In order to design and test a Model, some data must be available to test functionality. To make this possible, many working Models will make use of synthetic data during design. To simplify this process a synthetic data generator node is often employed. The purpose of this node is to allow model designers to work with models without connecting to a live data source. This may be implemented in one of two methods as either randomly generated data or by playing back a recorded scenario from a local database.

Figure 15:
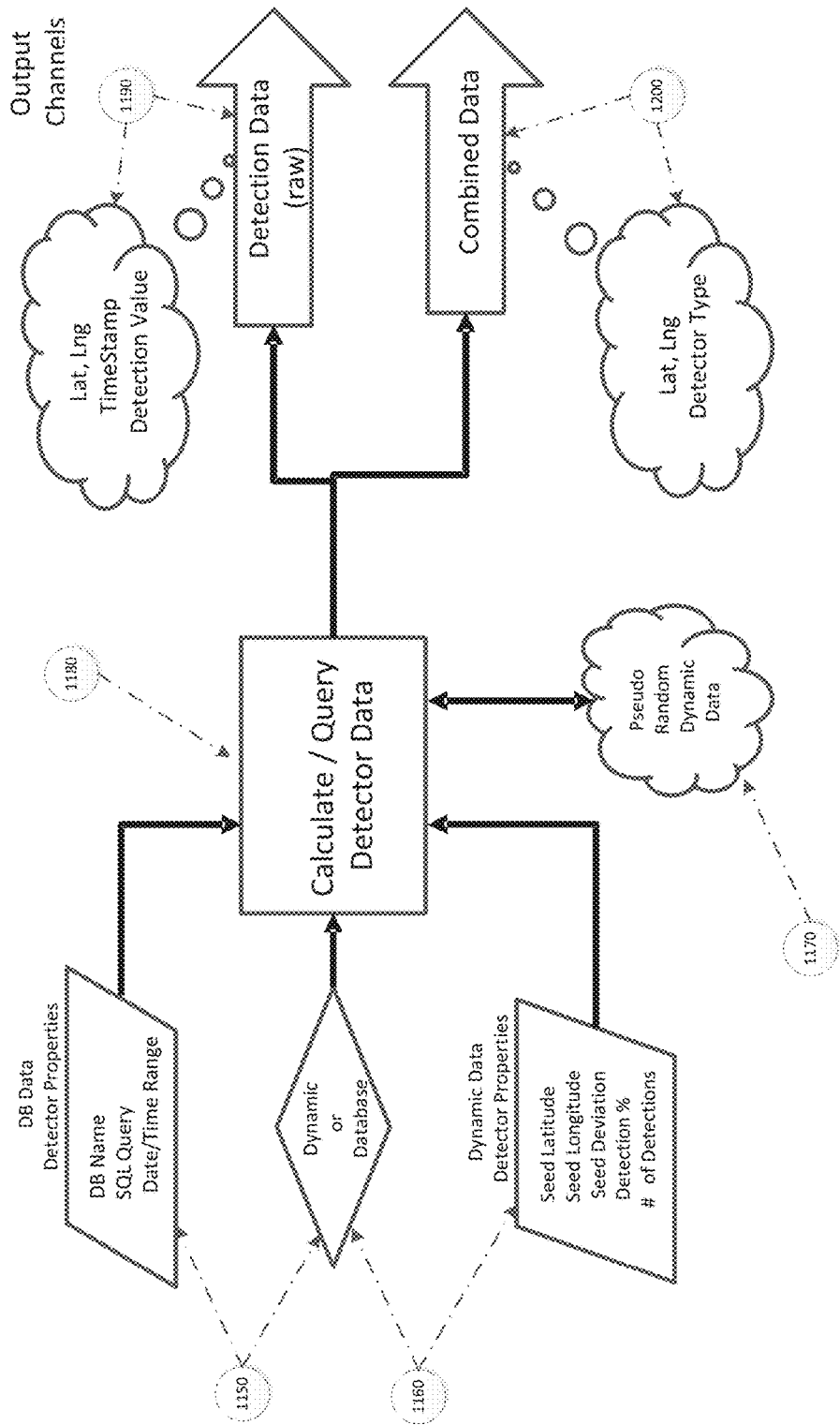
FIG. 15 is a schematic of an IED (Improvised Explosive Device) Implementation with emphasis on a Data Generator, according to the present invention.

Referring to FIG. 15, which refers to an IED Implementation, Data Generator Node, which is a specific example of a working node (or integrated node) derived from a generic template node. Often when used as a playback mechanism a database connection will be defined including a date range for the data that will be played at 1150. When used as a random data generator a node will use a location defined as a latitude and longitude at 1160. A deviation value will be used to determine in what area the points will be generated, that is deviation from the origin point. Detection percent and number of detections will be used to randomly generate detections within this range. A core process will either execute a query for playback or randomly generate data based on the specifications provided as seed values at 1170. Optionally, the core process may save the random data out to another data source for review or display at 1180. Detections will be output as raw data for downstream nodes at 1190. Combined data, including the sensor type and positions will be output at 1200. This data is useful to see positions of sensors even when detections have not occurred.

Figure 16:
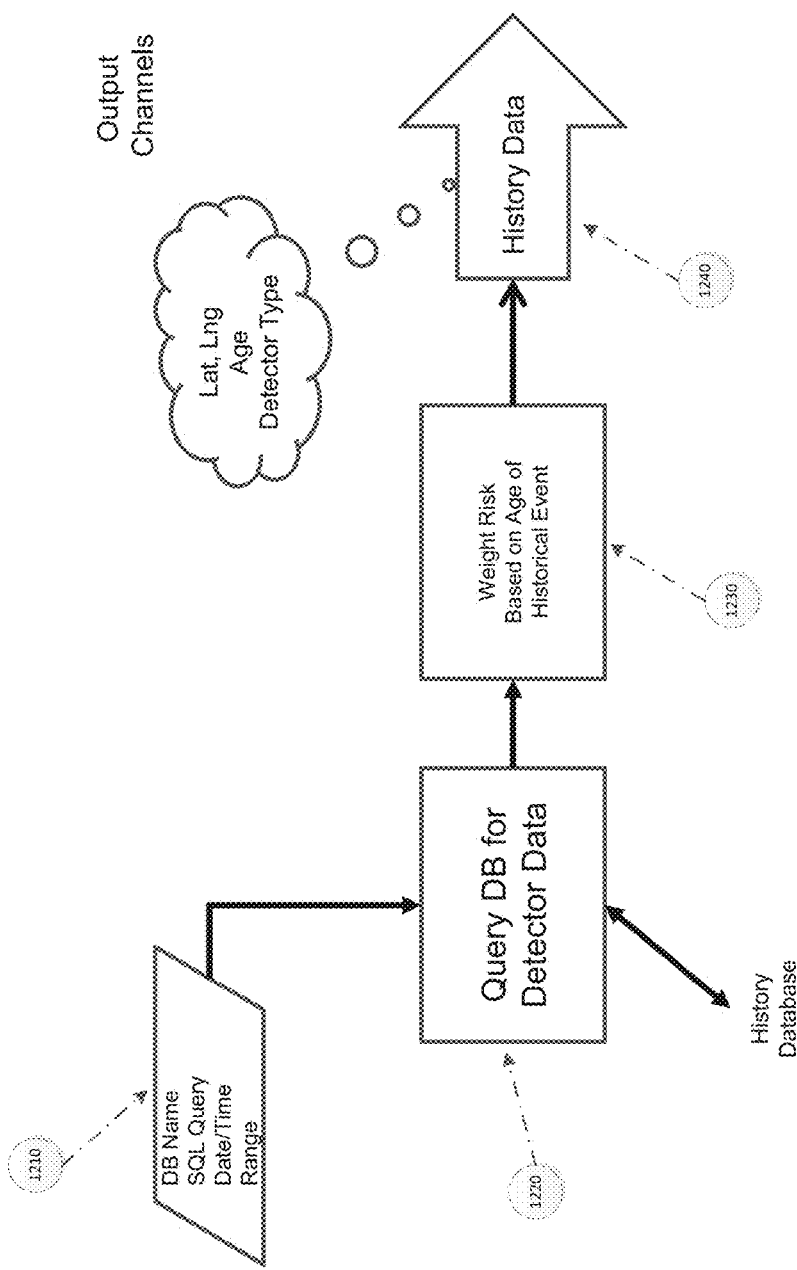
FIG. 16 is a schematic of an IED Implementation with emphasis on a History Node, according to the present invention.

Referring to FIG. 16, which refers to an IED Implementation, History Node, which is a specific example of a working node (or integrated node) derived from a generic template node. A database connection is defined at 1210 including a date range for the data that will be returned. Query database for detector data is provided at 1220. Events have a risk assigned based on age at 1230. Very old events will have a low weight while recent events will have a high weight value. History data is provided to output channels at 1240 for processing by downstream nodes.

Figure 17:
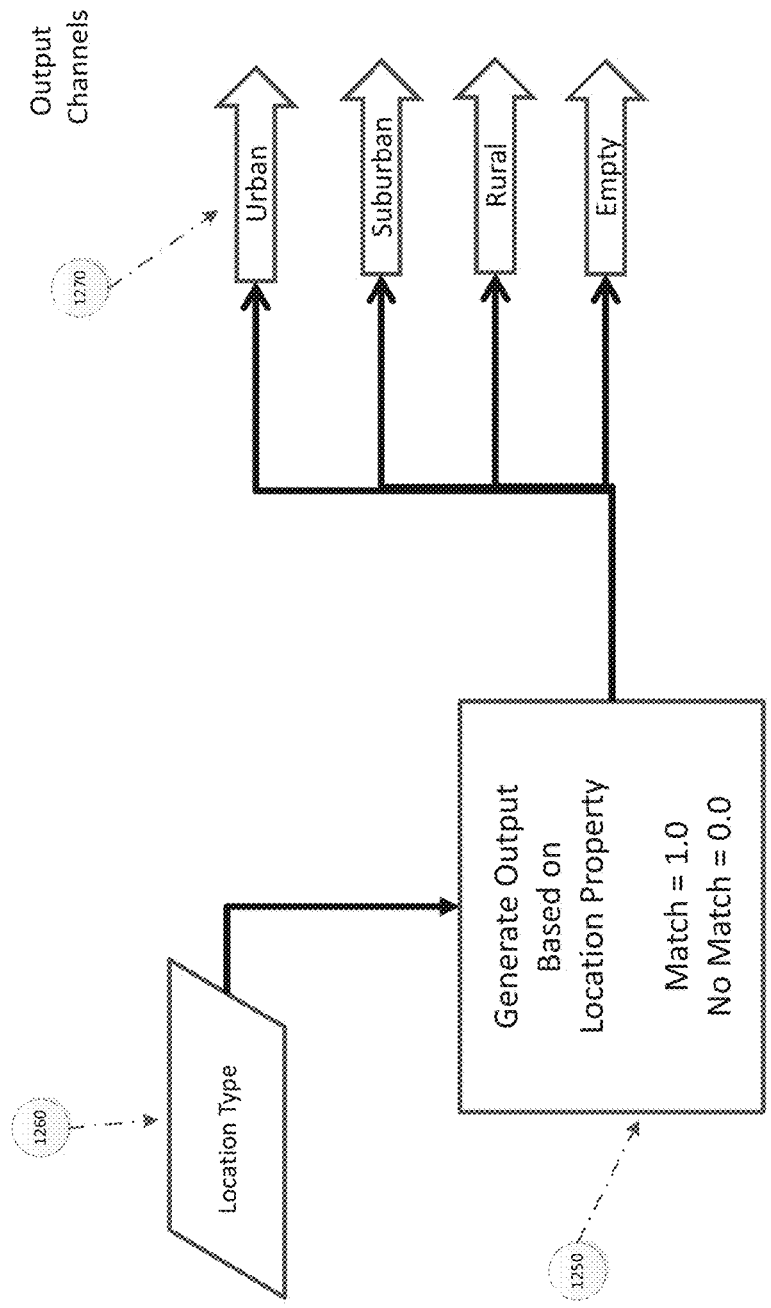
FIG. 17 is a schematic of an IED Implementation with emphasis on a Location Node, according to the present invention.

Referring to FIG. 17, which refers to an IED Implementation, Location Node, which is a specific example of a working node (or integrated node) derived by modifying a generic template node. A location type is selected, optionally by a user, at 1250. The core process generates a simple output value of 1 for the selected item and 0 for all others at 1260. At 1270 data is placed in the output channels for use by downstream nodes.

Figure 18:
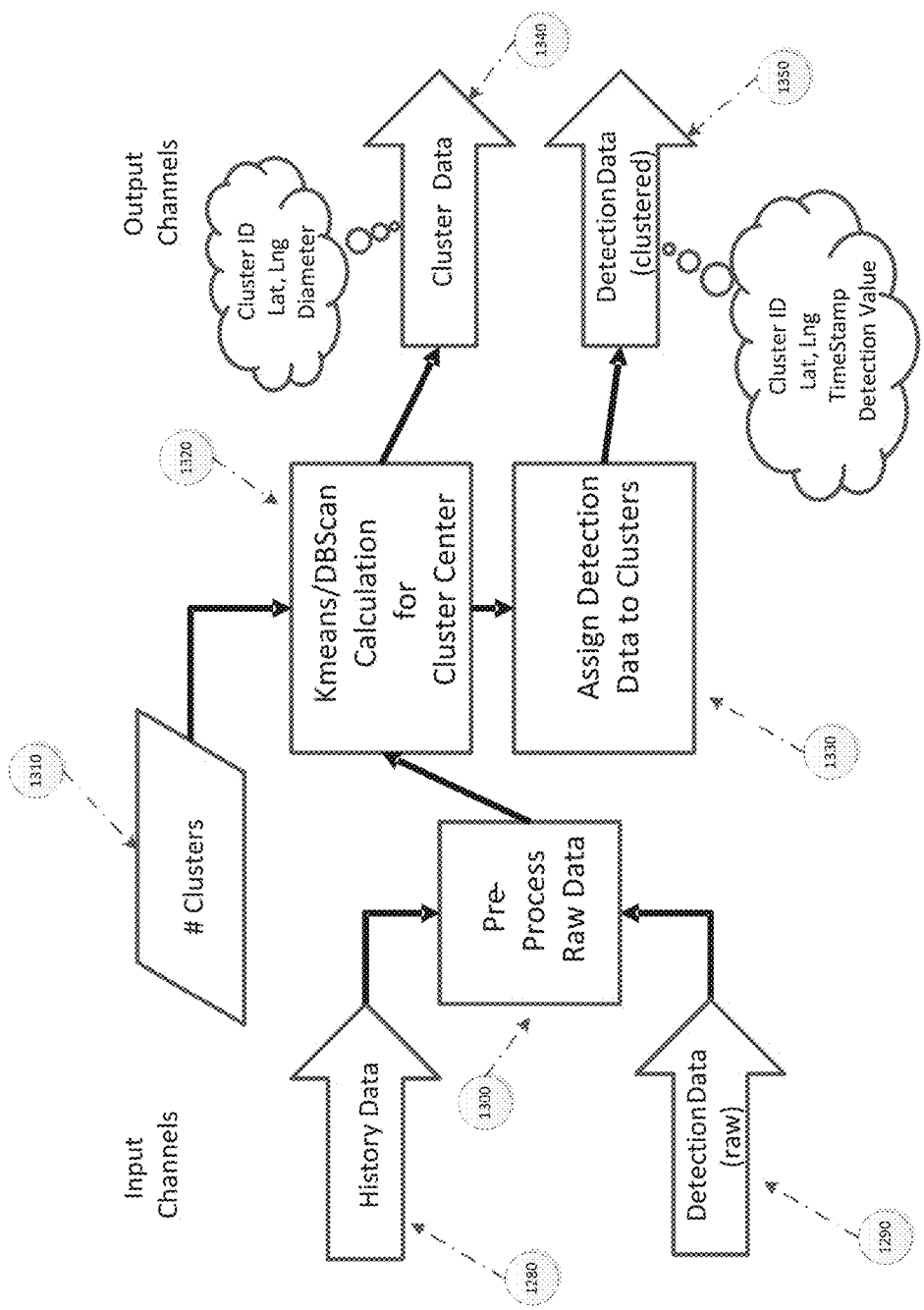
FIG. 18 is a schematic of an IED Implementation, Clustering Node, according to the present invention.

Referring to FIG. 18, which refers to an IED Implementation, Clustering Node, which is a specific example of a working node (or integrated node) derived from a generic template node. History data is provided at 1280. Detection data (live) is provided to the preprocessing mechanism at 1290. The preprocessing mechanism normalizes data for clustering. In this example working node (or integrated node), this entails standardizing sensor detection values to a floating point scale between 0 and 1.

The preprocessing mechanism normalizes data for clustering at 1300. For example, this can be done by standardizing sensor detection values to a floating point scale between 0 and 1. When using the Kmeans clustering mechanism at 1310 the number of clusters may be selected by the model designer. This is not required for density based clustering (DBScan). At 1320 the core process will execute either a Kmeans cluster or Density based cluster depending on user selection. Once clusters have been determined, each detection location is marked with the cluster ID to which it belongs 1330. Cluster data, that is, each cluster center as a latitude and longitude, cluster diameter and ID are applied to output channels 1340. Original detections, now marked with cluster ownership are applied to output channels at 1350. This includes the original detection latitude, longitude, time stamp detection value.

Figure 19:
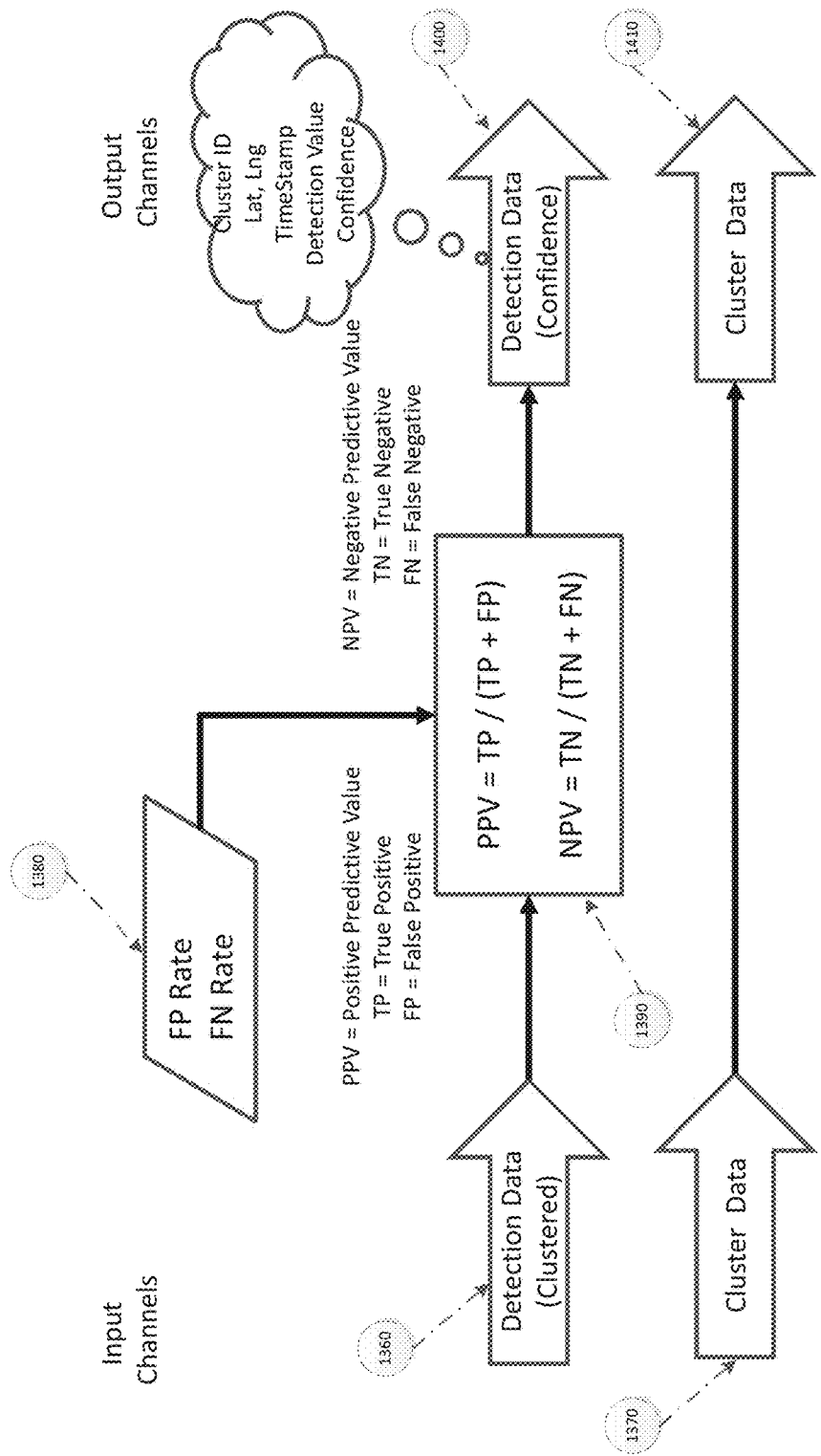
FIG. 19 is a schematic of an IED Implementation, Probability from Accuracy Node, according to the present invention.

FIG. 19 is a schematic of an IED Implementation, Probability from Accuracy Node according to the invention. The IED Implementation, Probability from Accuracy Node is a specific example of a working node (or integrated node) derived from a generic template node. The Probability from Accuracy node converts sensor accuracy values provided by the manufacturer to confidence values. Detection Data, marked with cluster IDs, are provided as inputs at 1360. Cluster data is provided as inputs at 1370. The false positive (FP) and false negative (FN) rates for each sensor input are entered at 1380 as provided by the manufacturers. The FP and FN rates are used to derive a confidence value for each sensor at 1390 and a confidence value is assigned to each sensor. The detection data is passed to the outputs now marked with a confidence value at 1400. Cluster data is passed from 1370 to 1410 without alteration.

Figure 20:
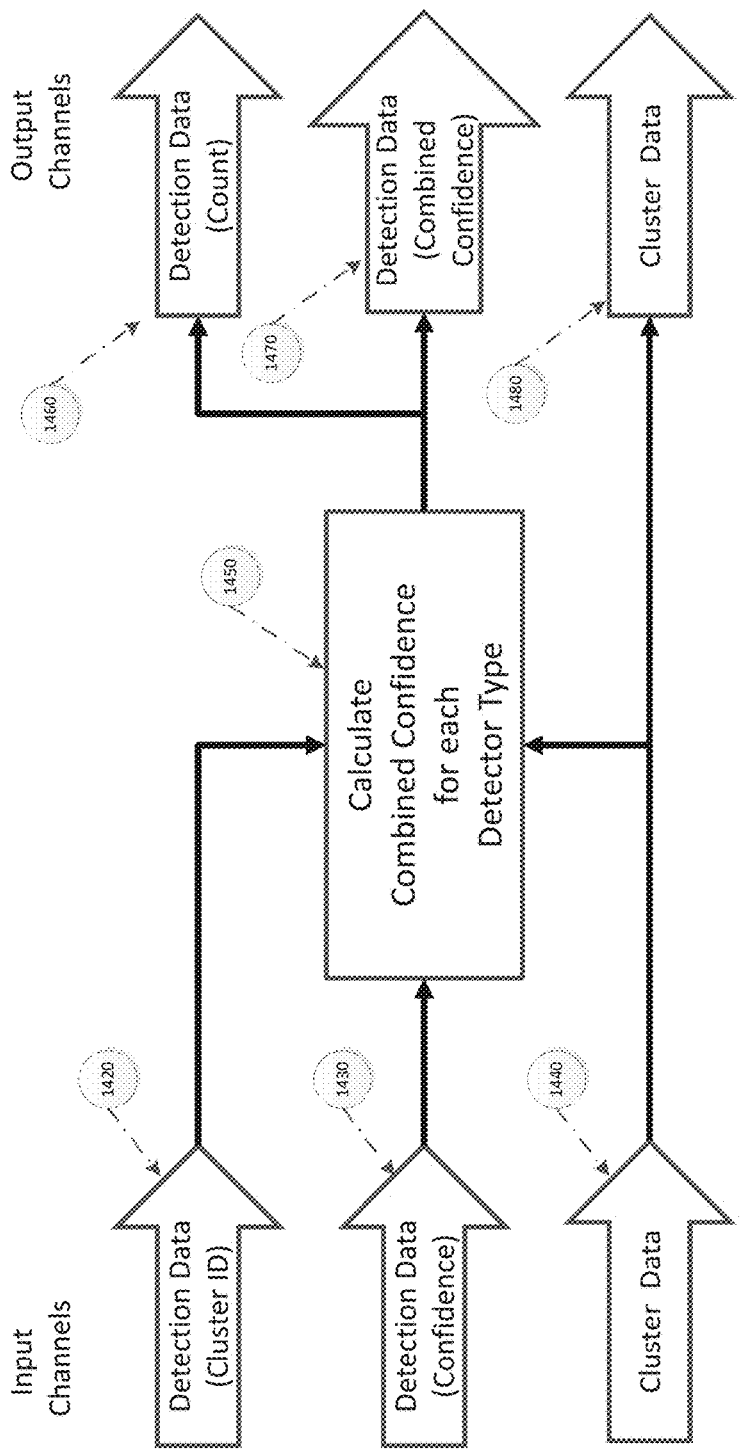
FIG. 20 is a schematic of an IED Implementation, Probability Combiner Node, according to the present invention.

FIG. 20 is a schematic of an IED Implementation, Probability Combiner Node according to the invention. The IED Implementation, Probability Combiner Node is a specific example of a working node (or integrated node) derived from a generic template node. Detection Data, marked with cluster IDs, are provided as inputs at 1420. Confidence values are provided as inputs at 1430. Cluster data is provided as inputs at 1440. The confidence values of the detections and counts the detections are combined at 1450, and these values are assigned to each cluster. For each cluster, detection counts are directed to output at 1460. For each cluster, a combined confidence value for each sensor type is directed to output at 1470. For each cluster, the original cluster data is copied to the outputs at 1480.

Figure 21:
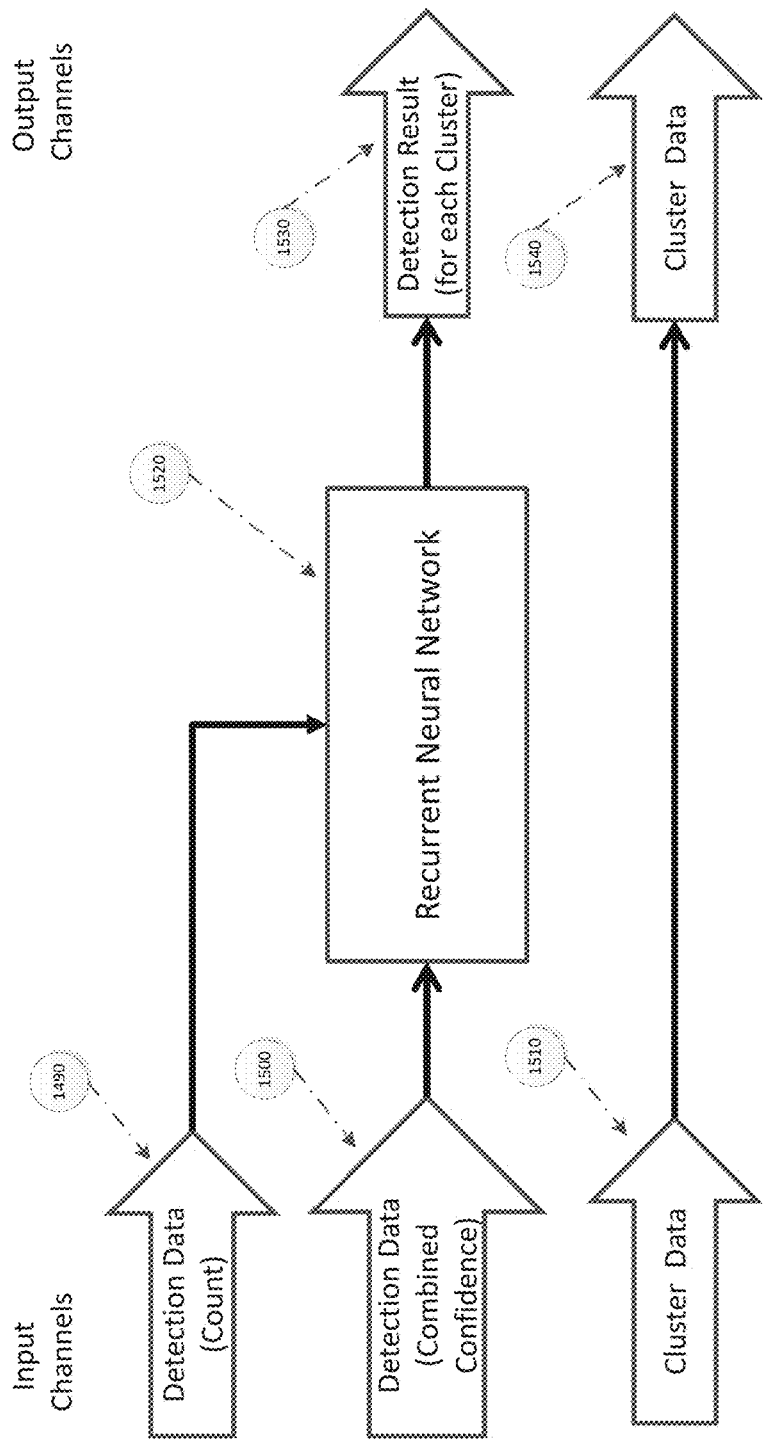
FIG. 21 is a schematic of an IED Implementation, Neural Network Node, according to the present invention.

FIG. 21 is a schematic of an IED Implementation, Neural Network Node, which is a specific example of a working node (or integrated node) derived by modifying a generic template node. Replicating human cognitive capabilities within software is not an easy task and several options are available for this need. In this particular implementation a recurrent neural network (RNN) is employed to replicate what would usually require a trained subject matter expert. The RNN is trained by responses from an actual subject matter expert and as a result, emulates the capabilities of this individual. Detection counts for each cluster are provided as inputs at 1490. Combined confidence values are provided as inputs at 1500. Cluster data is provided as inputs at 1510. This data will not be altered within the node and as such will be passed directly to outputs. The recurrent neural network looks at each cluster, the detection counts and confidence values and ranks each cluster for risk at 1520. Risk values for each cluster are provided as outputs at 1530. For each cluster, the original cluster data is copied to the outputs at 1540.

Figure 22:
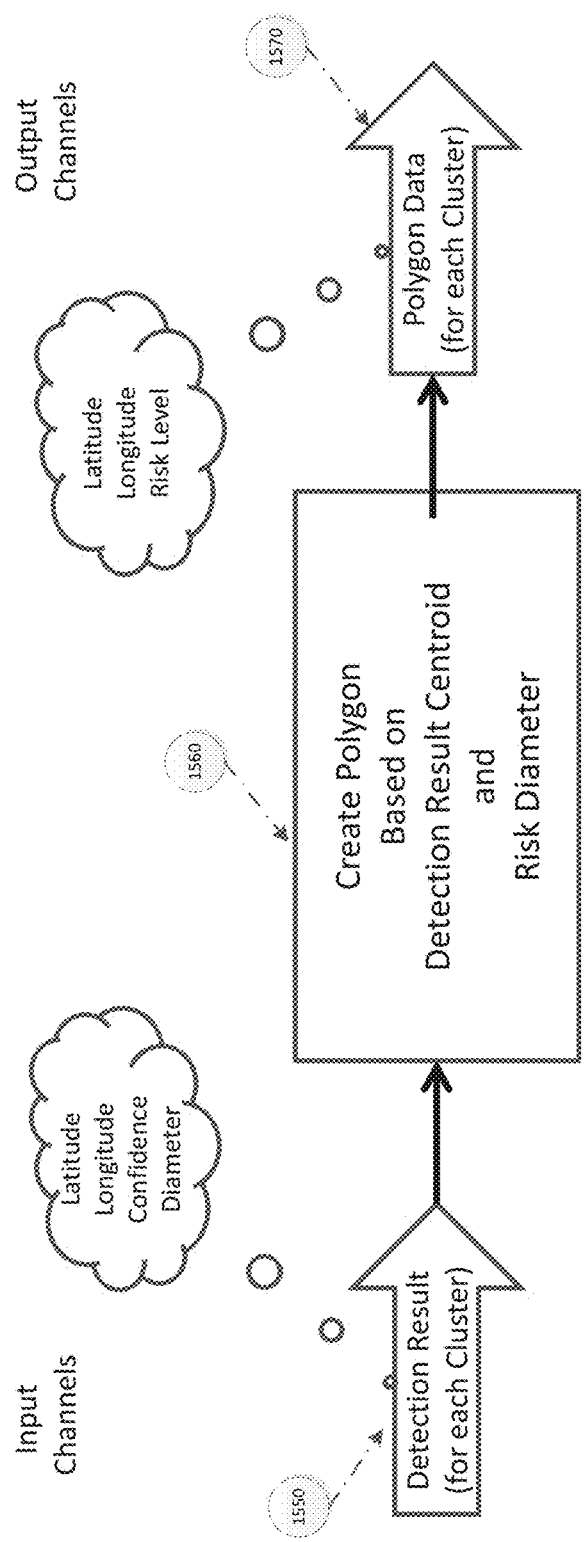
FIG. 22 is a schematic of an IED Implementation, Polygon Generator Node, according to the present invention.

FIG. 22 is a schematic of an IED Implementation, Polygon Generator Node, which is a specific example of a working node (or integrated node) derived by modifying a generic template node. Once all mathematical work in complete, a methods to display the results to users must be employed. The first step in this process is to convert the cluster information to polygons for display in a mapping application. Detection results for each cluster are provided as inputs at 1550. The cluster center and diameter is used as a basis for generating a line-based polygon for display in a downstream node at 1560. Each cluster is provided to an output channel as a polygon for rendering in a downstream rendering node at 1570.

Figure 23:
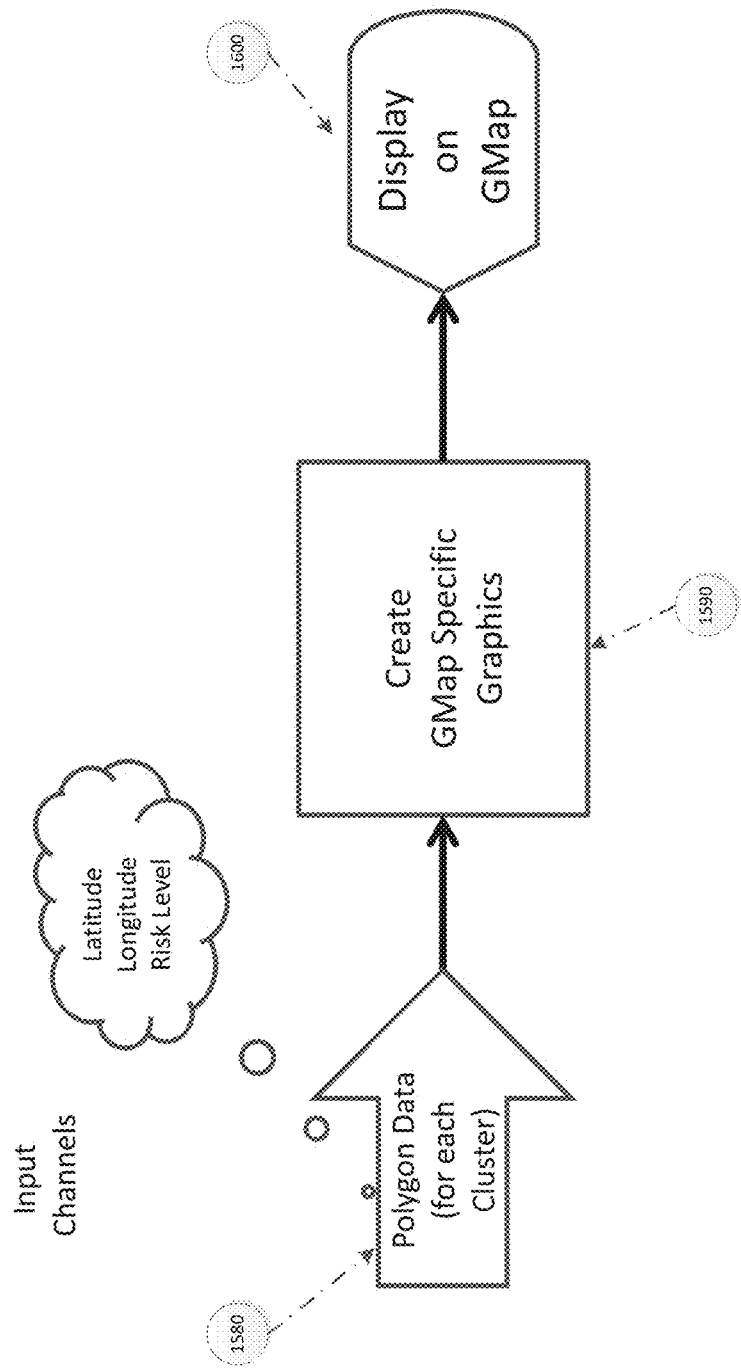
FIG. 23 is a schematic of an IED Implementation, GMap Display Node, according to the present invention.

FIG. 23 is a schematic of an IED Implementation, GMap Display Node, which is a specific example of a working node (or integrated node) derived by modifying a generic template node. A display and rendering mechanism is provided as a GMap display node. This node generates a map and renders the overlay. Polygon data for each cluster is provided as input at 1580. The core process applies polygons to an overlay object for rendering at 1590. The final output renders the overlay object on a mapping display component for users at 1600.

Figure 24:
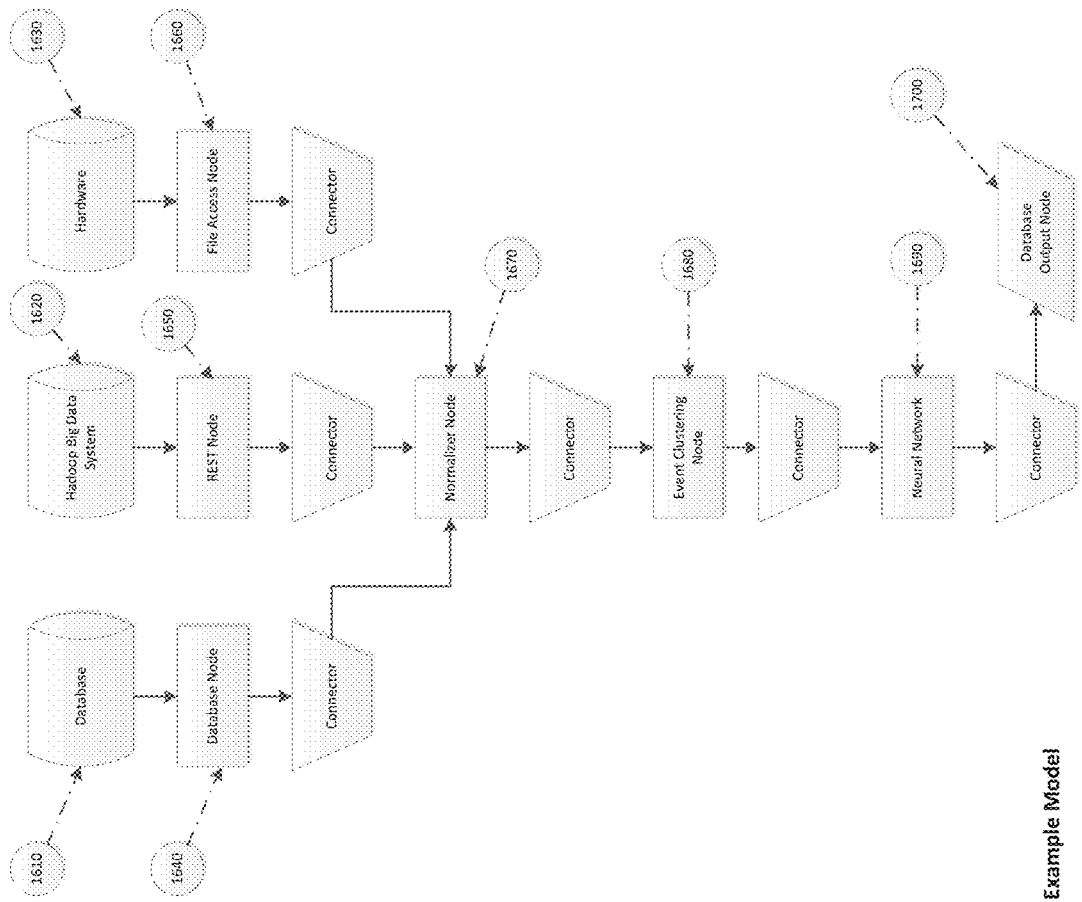
FIG. 24 is a schematic of a Cyber Security Example Model, according to the present invention.

FIG. 24 is a schematic Cyber Security Example Model. In this example implementation, a model is created to analyze log information to detect anomalous user behaviors. To achieve this goal, a model must access data at various temporal levels and process in a reasonable amount of time to alert system administrators of a current attack, impending attack or other methods used to compromise secure information, including insider threat concerns.

A database of prior offenses is provided at 1610. This data is used to enhance the risk assessment capabilities of current temporal log information. Hadoop Big Data System is provided at 1620. This type of system is often employed to mine historical data information. These systems support queries against extremely large volumes of information and many organizations will employ a Hadoop system to analyzing log files from many server and hardware devices. For some organizations this may involve analyzing terabytes or larger amounts of data. This example assumes that a Hadoop system is already in place and access will be provided to a node for queries in the same method as a traditional database node functions. Hardware devices supporting an organizations networking capabilities provide data and a temporal pace nearest real-time at 1630. Analyzing data from these devices before it is stored in the Hadoop big data system allows the model to be very responsive and have a capability to detect behaviors very quickly.

A Database Node is provided at 1640. Access to the data of prior offences it implemented in a database node using a data provider and standard query. A REST Node is provided at 1650, this working node (or integrated node) provides access to the Hadoop Big Data System is provided via a REST node. This is with the assumption that an organization already has employed a big data system for log file storage and analytics. A File Access Node is provided at 1660. Log files from hardware devices are accessed as files in this example. Files may be local to the devices or accessed from a file based staging mechanism before storage in the Hadoop big data system.

A Normalizer Node is provided at 1670. Because each of the data sources either stores or returns information in different formats it is important to normalize all data to be on a common scale and notation. For example, IP addresses are be represented in the same format, as well as time and location information. The normalizer node serves this purpose and processes data from each data source to be in the same format.

An Event Clustering Node is provided at 1680. Data for logged events are located geographically and temporally. In addition, to derive meaning the data is clustered into groups so that each grouping of data may be analyzed as a whole. The clustering node, which is an example of a working node (or integrated node) derived by modifying a generic template node, performs this work, grouping event data based on a density based clustering method.normalizer node serves this purpose and processes data from each data source to be in the same format.

An RNN (recurrent neural network) is provided at 1690. An RNN is employed to judge risk in the various detected data clusters. This RNN is trained from a subject matter expert and provide similar cognitive capabilities to a human expert. This node will examine each data cluster to determine the potential risk of various attack methods or anomalous behaviors.

A Database Output Node is provided at 1700. Risk values from the neural network along with cluster information are passed to the outputs of the model. These values may be used by a downstream system for an automated alerting mechanism or visual display mechanism for users.

Figure 25:
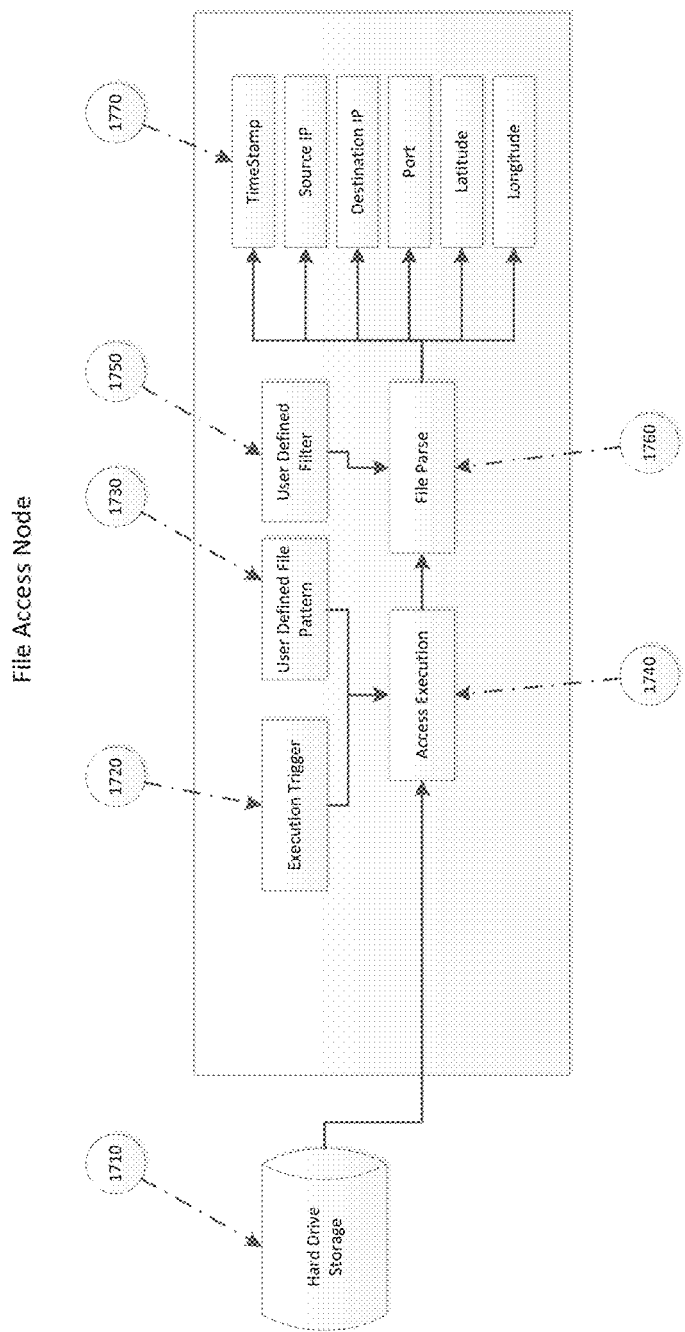
FIG. 25 is a schematic of a Cyber Security Implementation, File Access Node, according to the present invention.

FIG. 25 is a schematic of a Cyber Security Implementation, File Access Node, according to the present invention. Many hardware devices that log network activity may do so to a local file system. Direct file access may be required for some of these systems. In addition, some rudimentary parsing will be required to split log file lines.

An External Database is provided at 1710. An Execution Trigger is provided at 1720. This function is inherited from the generic template node. As a result, the File Access Node will process when triggered by its parent Host Model Process.

A User Defined File Pattern is provided at 1730. Output from the User Defined File Pattern at 1730 is directed to Access Execution at 1740 where a file stream is opened for access.

A User Defined Filter is provided at 1750 where line and column stripping filters are user defined to lower total data analyzed. File parsing is performed at 1760. The user defined filter is applied and the file is parsed and each column is applied to an output channel.

Figure 26:
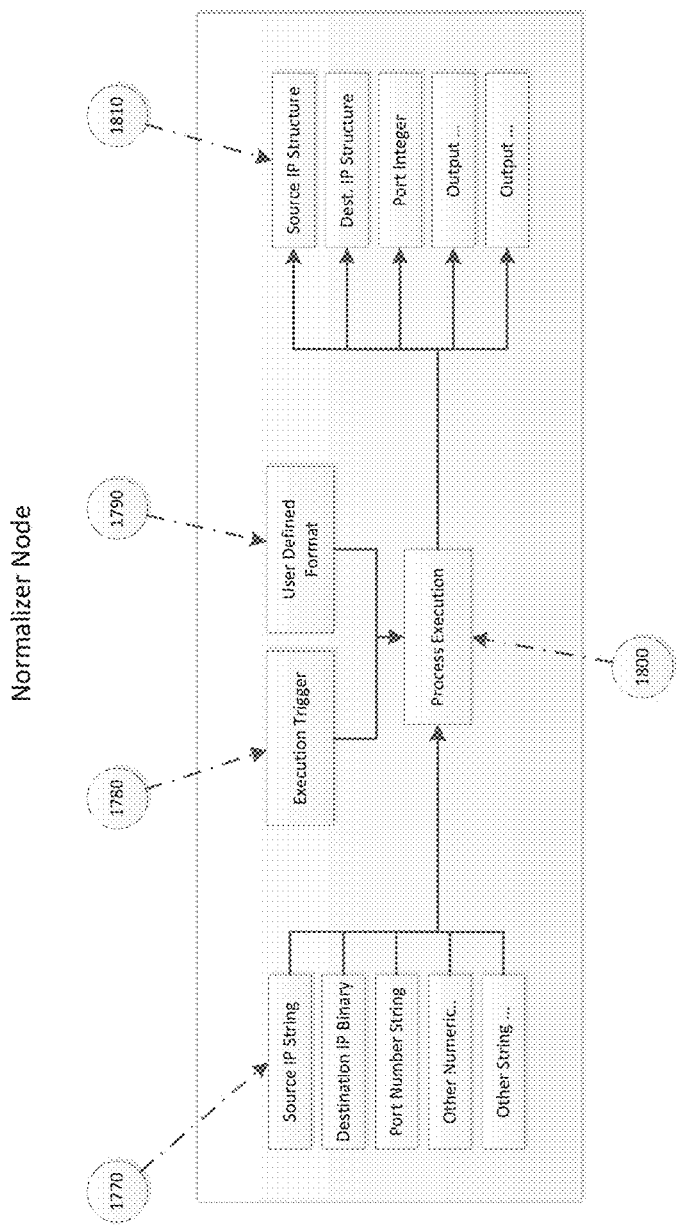
FIG. 26 is a schematic of a Normalizer Node according to the invention.

FIG. 26 is a schematic of a Normalizer Node according to the invention. Data from various sources may be represented in various formats. For example various numerical notations may be used to represent the same number. This node converts data values to a common format that may be user defined.

Data is directed to inputs 1770 in various formats. Execution Trigger is provided at 1780. This function is inherited from the generic node. As a result, the node will process when triggered by its parent Host Model Process.

A User Defined Format is provided at 1790. Output from the User Defined Format at 1790 is directed to Process Execution at 1800 where Translation formatting is applied. New formatted/translated data is copied to output channels at 1810.

Figure 27:
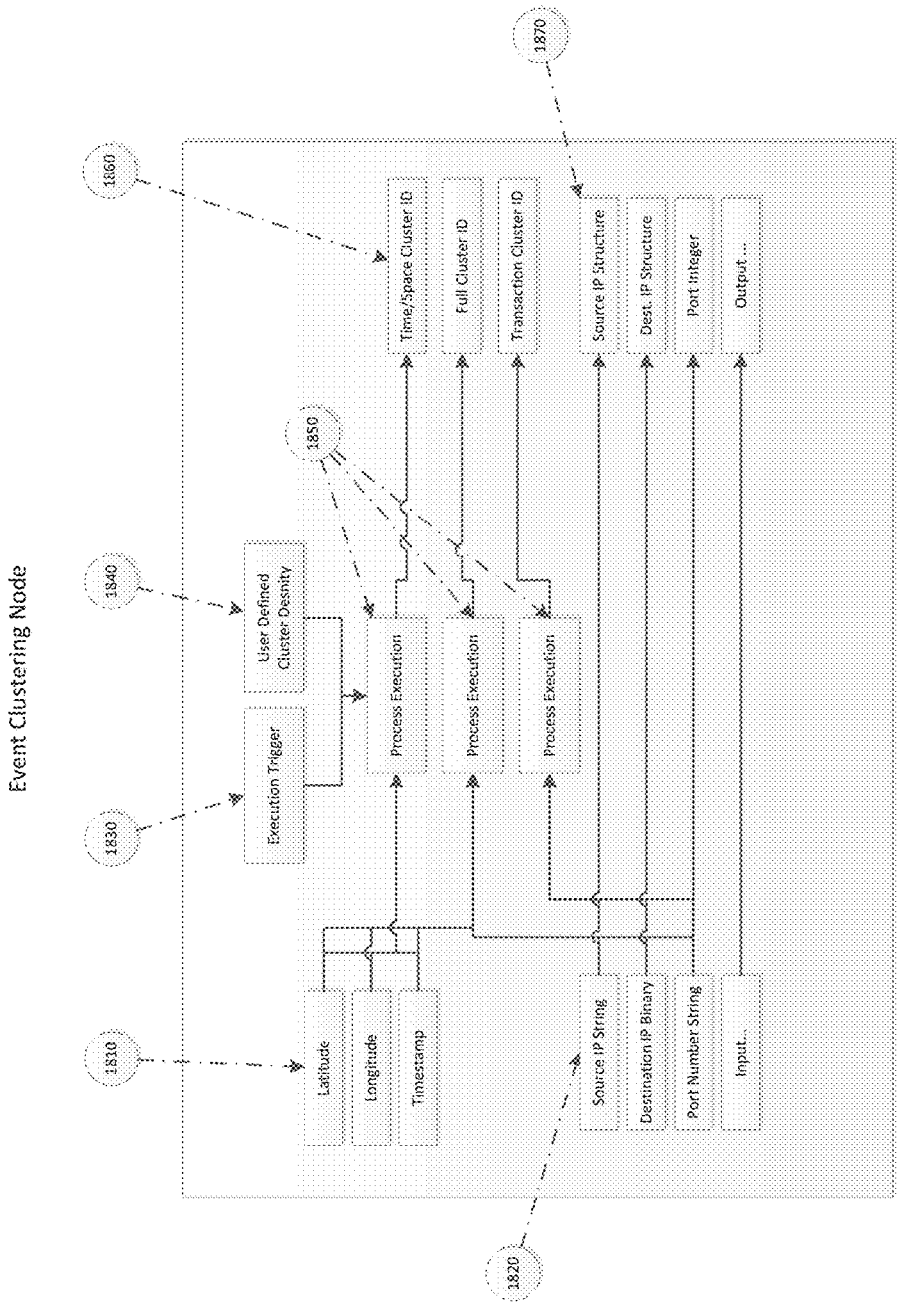
FIG. 27 is a schematic of a Cyber Security Implementation, Event Clustering Node.

FIG. 27 is a schematic of a Cyber Security Implementation, Event Clustering Node. In order to understand the relationship between events, item will be grouped based on several attributes that assist in deriving meaning. In particular, position and time, transaction details and a combination of both. These grouping, or clusters, will be provided to the neural network downstream for risk analysis.

Positional and temporal information are provided as inputs at 1820 and Transaction details are provided as inputs at 1830. An Execution Trigger is provided at 1840; this function is inherited from the generic node. As a result, the node will process when triggered by its parent Host Model Process.

Process Execution occurs at 1850 where the node processes the input in three groupings for three outputs. Position and temporal information provides the first cluster. Transaction information forms the second cluster. A combination of position, temporal and transaction information forms the third cluster.

User Defined Cluster Density is provided at 1860 where users may apply cluster density restrictions to alter how clusters are generated. Three cluster listings are output as Time/Space, Transaction and Full cluster information at 1870.

Figure 28:
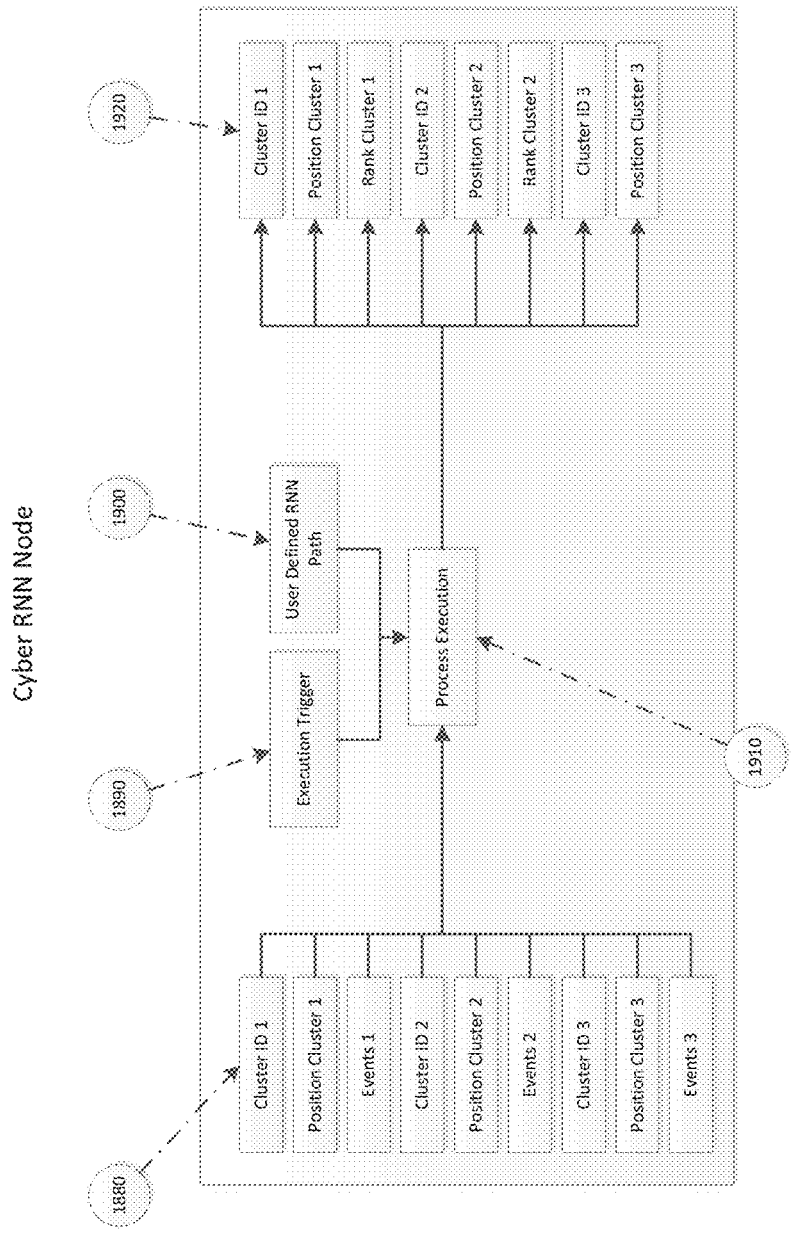
FIG. 28 is a schematic of a Cyber Security Implementation, Cyber RNN (a recurrent neural network).

FIG. 28 is a schematic of a Cyber Security Implementation, Cyber RNN. After all preprocessing and clustering, data will be properly arranged for risk assessment. This assessment takes place within a recurrent neural network that will observe and judge each cluster. Outputs will be a ranking for each cluster as well as the original cluster information for each cluster for display in an external system or alarm tool.

Clustering and event data are provided as inputs at 1880. An Execution Trigger at 1890 is a function that is inherited from the generic node. As a result, the node will process when triggered by its parent Host Model Process. User Defined RNN Path is provided at 1900; this is a user specified path and file name to the trained neural network that will be loaded. Process Execution occurs at 1910 where the input data is copied to an object array and shown to the RNN. The RNN will process and output a set of risk values ranking each cluster. Ranks for each cluster will be copied to outputs at 1920. In addition, original cluster information, including position, will be copied to outputs for mapping in a downstream display application.

Working Example

In this example a method is provided for predicting the presence of improvised explosive devices (IEDs) in an external environment. The method for predicting the presence of IEDs can be in the form of an executable code that runs on at least one processor such as an Intel processor found in modern day PCs (personal computer). The executable code is preferably run on multiple processors with at least one thereof having threading capability. The at least one processor being in communication with memory which instructions for performing the method. The method can also be performed by one or more generic template nodes 1 of the present invention each having one or more processors preferably with at least one processor having internal threading capability and which are in communication with sufficient memory to perform the following method steps.

The method comprises: (a) determining the location of the external environment; (b) classifying the location based on predetermined location types to provide a location_type; (c) receiving historical data on previous actual detection of IEDs in the location and performing an age analysis of the historical data; (d) performing a weight risk analysis based on age of the historical data and location_type; (e) detecting presence of IEDs in response to raw detection data received via one or more sensors; (f) calculating Positive Predictive Value (PPV) and Negative Predictive Value (NPV) for each detected IED; (g) calculating a confidence value for each detected IED based on PPV verses NPV; (h) weighting the confidence value of each detected IED based on location_type and age analysis of the location to provide a weighted confidence value; (i) performing a cut-off value for each weighted confidence value to predict one or more IEDs in said location, and outputting the predicted locations of IEDs.

Figure 29:
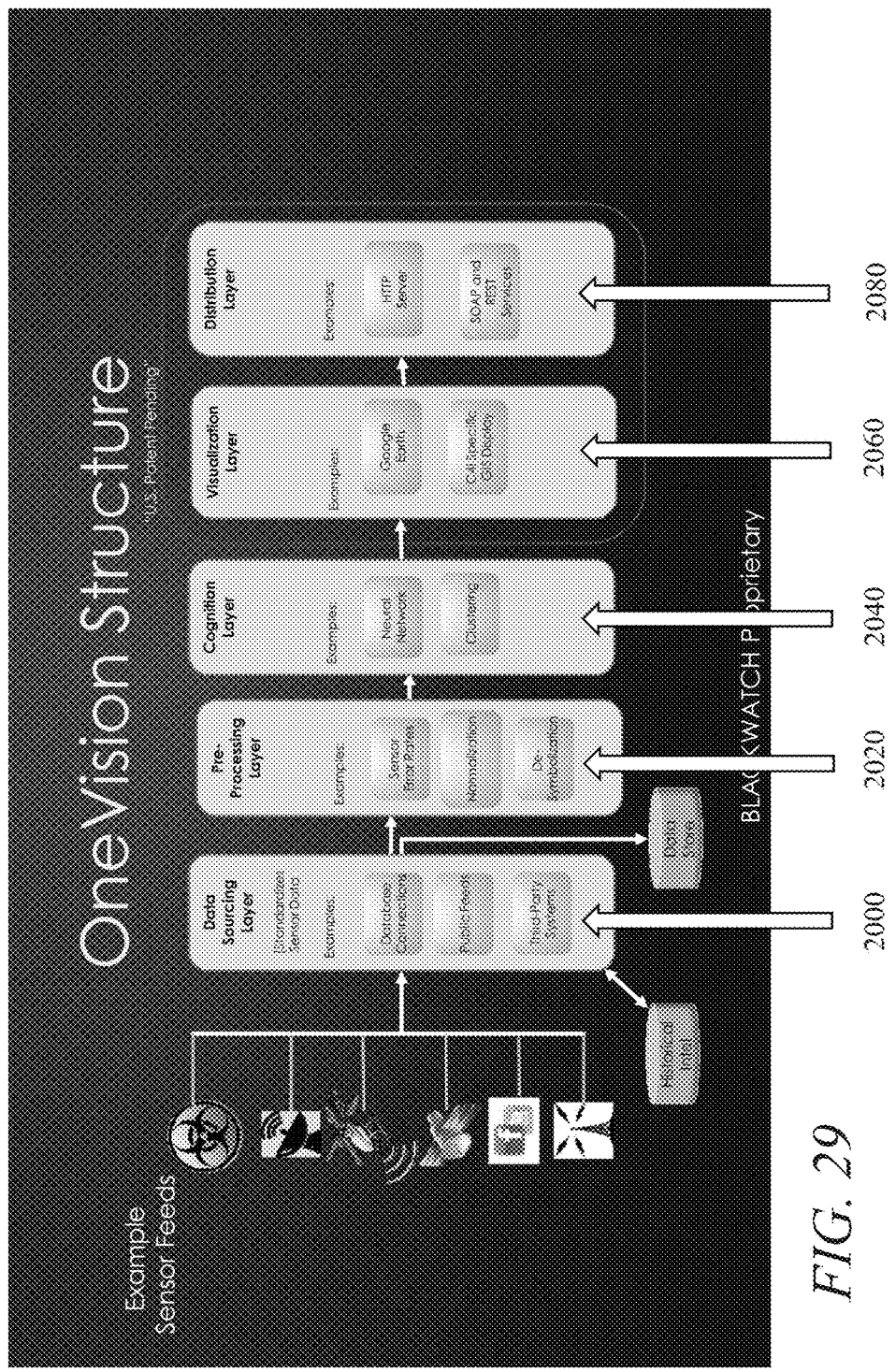
FIG. 29 shows layers of data processing according to the present invention.

The above method may be implemented by using dedicated layers of processors for performing the various steps and tasks in the method. For example, in FIG. 29 the method of working example #1 is deployed in the form of several layers of data processing. Specifically, a data sourcing layer 2000, a pre-processing layer 2020, a cognition layer 2040, a visualization layer 2060, and a distribution layer 2080.

The method may further comprise the step of classifying the likely type of each predicted IED based on the historical data on previous actual detection of IEDs in the location. The step of outputting the reportable detections of IEDs can further include the step of outputting instructions for a bomb disposal crew to deploy to examine at least one predicted IEDs. The development platform used to generate computer code to perform the method can be in the form of at least one generic template node.

It is to be understood that the present invention is not limited to the preferred embodiments described above, but encompasses any and all embodiments deemed within the scope of the following claims.

What is claimed is:

1. A generic template node, stored on at least one memory, and in communication with at least one processor, comprising:
   at least one user-modifiable process routine capable of executing instructions for integrating into the generic template node, to produce an integrated generic template node, at least one of, (i) a custom process, (ii) a canned common function, and (iii) a third-party software package
   wherein the instructions for integrating include
   (i) selecting a precompiled code library for inclusion,
   (ii) scanning the code library for exported functions and placing the exported functions in a list,
   (iii) selecting a desired function from the list, the desired function having a definition,
   (iv) wrapping the selected desired function to control access to the selected desired function, and
   (v) automatically configuring the node to define input and output channels associated with the desired function to make an integrated generic template node, without the use of a compiler; and
   a setup routine, operably linked to process routine to perform setup initialization of the generic template node, and
   wherein the generic template node is stored on the at least one memory in communication with the at least one processor.

2. The generic template node of claim 1, wherein the process user-modifiable process routine comprises an overridable setup routine.

3. A method of modular software development by modifying a plurality of generic template nodes, the method comprising the steps of:
   (a) providing a plurality of generic template nodes, stored on at least one memory, and in communication with at least one processor, each generic template node comprising
   at least one user-modifiable process routine capable of executing instructions for integrating into the generic template node, to produce an integrated generic template node, at least one of, (i) a custom process, (ii) a canned common function, and (iii) a third-party software package, to produce an integrated node;
   wherein the instructions for integrating include
   (i) selecting a precompiled code library for inclusion,
   (ii) scanning the code library for exported functions and placing the exported functions in a list,
   (iii) selecting a desired function from the list, the desired function having a definition,
   (iv) wrapping the selected desired function to control access to the selected desired function, and
   (v) automatically configuring the node to define input and output channels associated with the desired function to make an integrated generic template node, without the use of a compiler; and
   a setup routine, operably linked to the process routine to perform setup initialization of the generic template node, and
   wherein the generic template node is stored on the at least one memory in communication with the at least one processor; and
   (b) creating a model made up of interconnected integrated nodes, wherein a compiler is not required in developing the integrated nodes.

4. A method of modular software development by individually modifying a plurality of generic template node templates to create a model made up of interconnected integrated nodes, comprising:
   (a) providing a plurality of generic template nodes, stored on at least one memory, and in communication with at least one processor, each generic template node comprising
   at least one user-modifiable process routine capable of executing instructions for integrating into the generic template node, to produce an integrated generic template node, at least one of, (i) a custom process, (ii) a canned common function, and (iii) a third-party software package, to produce an integrated node;
   wherein the instructions for integrating include
   (i) selecting a precompiled code library for inclusion,
   (ii) scanning the code library for exported functions and placing the exported functions in a list,
   (iii) selecting a desired function from the list, the desired function having a definition,
   (iv) wrapping the selected desired function to control access to the selected desired function, and
   (v) automatically configuring the node to define input and output channels associated with the desired function to make an integrated generic template node, without the use of a compiler; and
   a setup routine, operably linked to to the process routine to perform setup initialization of the generic template node, and
   wherein the generic template node is stored on the at least one memory in communication with the at least one processor;
   (b) modifying the process routine to create an integrated node by executing instructions for integrating into the generic template node at least one of, (i) a custom process, and (ii) integrating a third-party software package;
   (c) repeating steps (a) and (b) to create a plurality of integrated nodes; and
   (d) providing connectivity between the integrated nodes, wherein the host process controls the integrated nodes to create a model software package.

5. A method of predicting the presence of improvised explosive devices (IEDs) in an external environment, the method comprising the steps of:
   (a) providing a plurality of generic template nodes, stored on at least one memory, and in communication with at least one processor, each generic template node comprising
   a plurality of definable input and output channels;
   at least one user-modifiable process routine capable of executing instructions for integrating into the generic template node, to produce integrated generic template node, at least one of, (i) a custom process, (ii) a canned common function, and (iii) a third-party software package, to produce an integrated node;
wherein the instructions for integrating include
(i) selecting a precompiled code library for inclusion,
(ii) scanning the code library for exported functions and placing the exported functions in a list,
(iii) selecting a desired function from the list, the desired function having a definition,
(iv) wrapping the selected desired function to control access to the selected desired function, and
(v) automatically configuring the node to define input and output channels associated with the desired function to make an integrated generic template node, without the use of a compiler; and
a setup routine, operably linked to process routine to perform setup initialization of the generic template node, and
(b) modifying the plurality of generic template nodes to develop a model for predicting the presence of improvised explosive devices (IEDs) in an external environment, the model performing the steps of,
(i) determining the location of the external environment;
(ii) classifying the location based on predetermined location types to provide a location type;
(iii) receiving historical data on previous actual detection of IEDs in the location and performing an age analysis of the historical data;
(iv) performing a weight risk analysis based on age of the historical data and location type;
(v) detecting presence of IEDs in response to raw detection data received via one or more sensors;
(vi) calculating Positive Predictive Value (PPV) and Negative Predictive Value (NPV) for each detected IED;
(vii) calculating a confidence value for each detected IED based on PPV verses NPV;
(viii) weighting the confidence value of each detected IED based on location type and age analysis of the location to provide a weighted confidence value;
(ix) performing a cut-off value for each weighted confidence value to predict one or more IEDs in said location; and
(x) outputting the predicted locations of IEDs.

6. The method according to claim 5, further comprising the step of:
(c) classifying the likely type of each predicted IED based on a historical data set, wherein the historical data set includes previous actual detection of IEDs in a predicted location.

7. The method according to claim 5, wherein step (x), outputting the reportable detections of IEDs, includes outputting instructions for a bomb disposal crew to deploy to examine at least one predicted IED.

8. The method according to claim 5, wherein a development platform generates computer code to perform said method, wherein the development platform comprises at least one generic template node.

9. A system for executing a plurality of generic template nodes, the system comprising:
one or more memories having a generic template nodes stored thereon; and
one or more processors operably connected to the one or more memories,
wherein the generic template node comprise
a plurality of definable input and output channels;
at least one user-modifiable process routine capable of executing instructions for integrating into the generic template node, to produce an integrated generic template node, at least one of, (i) a custom process, (ii) a canned common function, and (iii) a third-party software package, to produce an integrated node;
wherein the instructions for integrating include
(i) selecting a precompiled code library for inclusion,
(ii) scanning the code library for exported functions and placing the exported functions in a list,
(iii) selecting a desired function from the list, the desired function having a definition,
(iv) wrapping the selected desired function to control access to the selected desired function, and
(v) automatically configuring the node to define input and output channels associated with the desired function to make an integrated generic template node, without the use of a compiler; and
a setup routine, operably linked to process routine to perform setup initialization of the generic template node.

10. The system according to claim 9, wherein the one or more processors are connected in parallel.

11. A method for making a system for predicting the presence of improvised explosive devices (IEDs) in an external environment, the method comprising the steps of:
(a) providing a plurality of generic template nodes stored on at least one memory, and in communication with at least one processor, each generic template node comprising
a plurality of definable input and output channels;
at least one user-modifiable process routine capable of executing instructions for integrating into the generic template node, to produce an integrated generic template node, at least one of, (i) a custom process, (ii) a canned common function, and (iii) a third-party software package; to produce an integrated node;
wherein the instructions for integrating include
(i) selecting a precompiled code library for inclusion,
(ii) scanning the code library for exported functions and placing the exported functions in a list,
(iii) selecting desired function from the list, the desired function having a definition,
(iv) wrapping the selected desired function to control access to the selected desired function, and
(v) automatically configuring the node to define input and output channels associated with the desired function to make an integrated generic template node, without the use of a compiler; and
a setup routine, operably linked to the process routine to perform setup initialization of the generic template node;
(b) providing one or more memories having one of the plurality of generic template nodes stored thereon, and one or more processors operably connected to the one or more memories; and
(c) modifying the plurality of generic template nodes to develop a model for predicting the presence of IEDs in an external environment, the model comprising the steps of
(i) determining the location of the external environment;
(ii) classifying the location based on predetermined location types to provide location type;

(iii) receiving historical data on previous actual detection of IEDs in the location and performing an age analysis of the historical data;
(iv) performing a weight risk analysis based on age of the historical data and location type;
(v) detecting presence of IEDs in response to raw detection data received via one or more sensors;
(vi) calculating Positive Predictive Value (PPV) and Negative Predictive Value (NPV) for each detected IED;
(vii) calculating a confidence value for each detected IED based on PPV verses NPV;
(viii) weighting the confidence value of each detected IED based on location type and age analysis of the location to provide a weighted confidence value;
(ix) performing a cut-off value for each weighted confidence value to provide reportable detections of IEDs, and
(x) outputting the reportable detections of IEDs.

12. A method for using a system for predicting the presence of improvised explosive devices (IEDs) in an external environment, the method comprising the steps of:
(a) providing a system for executing a plurality of generic template nodes, the system comprising
one or more memories having a generic template nodes stored thereon; and
one or more processors operably connected to the one or more memories, wherein the generic template node comprise
a plurality of definable input and output channels;
at least one user-modifiable process routine capable of executing instructions for integrating into the generic template node, to produce an integrated generic template node, at least one of, (i) a custom process, (ii) a canned common function, and (iii) a third-party software package, to produce an integrated node;
wherein the instructions for integrating include
(i) selecting a precompiled code library for inclusion,
(ii) scanning the code library for exported functions and placing the exported functions in a list,
(iii) selecting a desired function from the list, the desired function having a definition,
(iv) wrapping the selected desired function to control access to the selected desired function, and
(v) automatically configuring the node to define input and output channels associated with the desired function to make an integrated generic template node, without the use of a compiler; and
a setup routine, operably linked to a host process processor to perform setup initialization of the generic template node;
(b) modifying the plurality of generic template nodes to develop a model to detect IEDs;
(c) using the model to obtain history data for a selected external environment and raw IED detection data obtained from the selected external environment;
(d) combining the history data and raw detection data;
(e) generating cluster data and clustered detection data;
(f) performing PPV and NPV analysis of the clustered detection data to obtain confidence detection data;
(g) calculating combined confidence data based on a combination of clustered detection data, confidence detection data, and cluster data to provide detection count data and detection combined confidence data, with cluster data remaining unchanged;
(h) feeding detection count data and detection combined confidence data to a recurrent neural network to provide detection result data for each cluster;
(i) generating polygon data from the detection result data for each cluster; and
(j) outputting the polygon data to a display system.

13. A method for using a system for predicting the presence of improvised explosive devices (IEDs) in an external environment, the method comprising the steps of:
(a) providing a plurality of generic template nodes comprising
a plurality of definable input and output channels;
at least one user-modifiable process routine capable of executing instructions for integrating into the generic template node, to produce an integrated generic template node, at least one of, (i) a custom process, (ii) a canned common function, and (iii) a third-party software package, to produce an integrated node;
wherein the instructions for integrating include
(i) selecting a precompiled code library for inclusion,
(ii) scanning the code library for exported functions and placing the exported functions in a list,
(iii) selecting a desired function from the list, the desired function having a definition,
(iv) of wrapping the selected desired function to control access to the selected desired function, and
(v) automatically configuring the node to define input and output channels associated with the desired function to make an integrated generic template node, without the use of a compiler; and
a setup routine, operably linked to the process routine to perform setup initialization of the generic template node;
(b) modifying the plurality of generic template nodes to develop a model for predicting the presence of IEDs, the model comprising the steps of
(i) determining the location of the external environment,
(ii) classifying the location based on predetermined location types to provide location-type, and
(iii) receiving historical data on previous actual detection of IEDs in the location and performing an age analysis of the historical data,
wherein the system includes
(1) a preprocessing layer operably connected to
(i) perform a weight risk analysis based on age of the historical data and locationtype, and
(ii) detect presence of IEDs in response to raw detection data received via one or more sensors;
(2) a cognition layer having a processor associated therewith and having memory with instructions therein for,
(i) calculating Positive Predictive Value (PPV) and Negative Predictive Value (NPV) for each detected IED,
(ii) calculating a confidence value for each detected IED based on PPV verses NPV;
(iii) weighting the confidence value of each detected IED based on location type and age analysis of the location to provide a weighted confidence value, and
(iv) applying a cut-off value for each weighted confidence value to provide reportable detections of IEDs;
(3) an output layer having a processor associated therewith and having memory with instructions therein for outputting the reportable detections of IEDs; and
(c) employing the system for predicting the presence of IEDs in an external environment via the model.

14. A method of providing the building blocks of a cyber security, the method comprising the steps of:
(a) providing a plurality of generic template nodes comprising
a plurality of definable input and output channels;
at least one user-modifiable process routine capable of executing instructions for integrating into the generic template node, to produce an integrated generic template node, at least one of, (i) a custom process, (ii) a canned common function, and (iii) a third-party software package, to produce an integrated node;
wherein the instructions for integrating include
(i) selecting a precompiled code library for inclusion,
(ii) scanning the code library for exported functions and placing the exported functions in a list,
(iii) selecting a desired function from the list, the desired function having a definition,
(iv) of wrapping the selected desired function to control access to the selected desired function, and
(v) automatically configuring the node to define input and output channels associated with the desired function to make an integrated generic template node, without the use of a compiler; and
a setup routine, operably linked to process routine to perform setup initialization of the generic template node; and
(b) modifying the plurality of generic template nodes to provide,
a file access node,
a normalization node,
an event clustering node, and
a cyber Recurrent Neural Network (RNN) node.

15. The method of claim 14, wherein the file access node includes an Execution Trigger inherited from a generic node template.

16. The method of claim 14, wherein the normalization node includes an Execution Trigger inherited from a generic node template.

17. The method of claim 14, wherein the event clustering node includes an Execution Trigger inherited from a generic node template.

18. The method of claim 12, wherein the cyber RNN node includes an Execution Trigger inherited from a generic node template.

19. A method of providing the building blocks of a predicting the presence of improvised explosive devices (IEDs), the method comprising the steps of:
(a) providing a plurality of generic template nodes comprising
a plurality of definable input and output channels;
at least one user-modifiable process routine capable of executing instructions for integrating into the generic template node, to produce an integrated generic template node, at least one of, (i) a custom process, (ii) a canned common function, and (iii) a third-party software package, to produce an integrated node;
wherein the instructions for integrating include
(i) selecting a precompiled code library for inclusion,
(ii) scanning the code library for exported functions and placing the exported functions in a list,
(iii) selecting a desired function from the list, the desired function having a definition,
(iv) wrapping the selected desired function to control access to the selected desired function, and
(v) automatically configuring the node to define input and output channels associated with the desired function to make an integrated generic template node, without the use of a compiler; and
a setup routine, operably linked to the process routine to perform setup initialization of the generic template node; and
(b) modifying the plurality of generic template nodes to provide,
a History Node node,
a Location Node,
a Clustering Node,
a Probability Node,
a Probability Combiner Node, and
a Neural Network Node.

20. The method of claim 19, wherein the Probability Node is a Probability from Accuracy Node.

21. A method of providing the building blocks of a predicting the presence of improvised explosive devices (IEDs), the method comprising the steps of:
(a) providing a plurality of generic template nodes comprising
a plurality of definable input and output channels;
at least one user-modifiable process routine capable of executing instructions for integrating into the generic template node, to produce an integrated generic template node, at least one of, (i) a custom process, (ii) a canned common function, and (iii) a third-party software package, to produce an integrated node;
wherein the instructions for integrating include
(i) selecting a precompiled code library for inclusion,
(ii) scanning the code library for exported functions and placing the exported functions in a list,
(iii) selecting a desired function from the list, the desired function having a definition,
(iv) wrapping the selected desired function to control access to the selected desired function, and
(v) automatically configuring the node to define input and output channels associated with the desired function to make an integrated generic template node, without the use of a compiler; and
a setup routine, operably linked to a host process processor to perform setup initialization of the generic template node; and
(b) modifying the plurality of generic template nodes to provide,
a History Node node,
a Location Node,
a Clustering Node,
a Probability from Accuracy Node,
a Probability Combiner Node,
a Neural Network Node,
a Polygon Generator Node, and
a GMap Display Node.

* * * * *